(12) United States Patent
Oka

(10) Patent No.: US 9,851,504 B2
(45) Date of Patent: Dec. 26, 2017

(54) PLANAR OPTICAL WAVEGUIDE DEVICE, DP-QPSK MODULATOR, COHERENT RECEIVER, AND POLARIZATION DIVERSITY

(71) Applicant: FUJIKURA LTD., Tokyo (JP)

(72) Inventor: Akira Oka, Sakura (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 0 days.

(21) Appl. No.: 15/281,366

(22) Filed: Sep. 30, 2016

(65) Prior Publication Data

US 2017/0017033 A1    Jan. 19, 2017

Related U.S. Application Data

(63) Continuation of application No. PCT/JP2015/053770, filed on Feb. 12, 2015.

(30) Foreign Application Priority Data

Apr. 3, 2014    (JP) .................................. 2014-077232

(51) Int. Cl.
*G02B 6/126*    (2006.01)
*G02B 6/122*    (2006.01)
(Continued)

(52) U.S. Cl.
CPC ............ *G02B 6/126* (2013.01); *G02B 6/122* (2013.01); *G02B 6/125* (2013.01); *G02B 6/1228* (2013.01);
(Continued)

(58) Field of Classification Search
CPC ............................ G02B 6/1228; G02B 6/126
See application file for complete search history.

(56) References Cited

U.S. PATENT DOCUMENTS 9,531,159 B2 * 12/2016 Li ........................ G02B 6/125
2004/0114872 A1    6/2004 Nagai
(Continued)

FOREIGN PATENT DOCUMENTS

JP    56-66819 A    6/1981
JP    3-81706 A    4/1991
(Continued)

OTHER PUBLICATIONS

Daoxin Dai, et al., "Novel concept for ultracompact polarization splitter-rotator based on silicon nanowires," Optics Express, May 2011, pp. 10940-10949, vol. 19, No. 11.
(Continued)

*Primary Examiner* — Omar R Rojas
(74) *Attorney, Agent, or Firm* — Sughrue Mion, PLLC

(57) ABSTRACT

A planar optical waveguide device includes: a substrate; a core that forms a first waveguide and a second waveguide that are arranged in parallel on the substrate; and a cladding that covers the core and has a refractive index smaller than that of the core. The core includes a first rib portion that forms the first waveguide, a second rib portion that forms the second waveguide, and a slab portion that is provided only on one side of the first rib portion and the second rib portion in a width direction to have a thickness smaller than the thicknesses of the first rib portion and the second rib portion and is shared between the first rib portion and the second rib portion.

20 Claims, 30 Drawing Sheets

(51) Int. Cl.
  G02B 6/14    (2006.01)
  G02B 6/125   (2006.01)
  G02B 6/12    (2006.01)
(52) U.S. Cl.
  CPC ...... *G02B 6/14* (2013.01); *G02B 2006/12097* (2013.01)

(56) References Cited

U.S. PATENT DOCUMENTS

| 2013/0156361 | A1  | 6/2013 | Kojima et al. |
| 2014/0133796 | A1* | 5/2014 | Dong .................... G02B 6/126 385/11 |

FOREIGN PATENT DOCUMENTS

| JP | 6-18737 A      | 1/1994  |
| JP | 7-110411 A     | 4/1995  |
| JP | 2003-279767 A  | 10/2003 |
| JP | 2004-191954 A  | 7/2004  |
| JP | 2013-125276 A  | 6/2013  |

OTHER PUBLICATIONS

Yunhong Ding, et al., "On-chip two-mode division multiplexing using tapered directional coupler-based mode multiplexer and demultiplexer," Optics Express, Apr. 2013, pp. 10376-10382, vol. 21, No. 8.

Maxim Greenberg, et al., "Multimode add-drop multiplexing by adiabatic linearly tapered coupling," Optics Express, Nov. 2005, pp. 9381-9387, vol. 13, No. 23.

P. Dong, et al., "112-Gb/s Monolithic PDM-QPSK Modulator in Silicon," in European Conference and exhibition on Optical Communication 2012, p. Th.3.B.1, vol. 1.

C. R. Doerr, et al., "Packaged Monolithic Silicon 112-Gb/s Coherent Receiver," IEEE Photonics Technology Letters, Jun. 2011, pp. 762-764, vol. 23.

Qing Fang, et al., "Suspended optical fiber-to-waveguide mode size converter for Silicon photonics", Optics Express, Apr. 2010, pp. 7763-7769, vol. 18, No. 8.

Hiroshi Fukuda, et al., "Silicon photonic circuit with polarization diversity," Optics Express, Mar. 2008, pp. 4872-4880, vol. 16, No. 7.

International Search Report for PCT/JP2015/053770 dated Apr. 21, 2015.

Japanese Notice of Reasons for Rejection for JP 2014-077232 dated Oct. 7, 2014.

Japanese Notice of Allowance for JP 2014-077232 dated Feb. 3, 2015.

* cited by examiner (a)

(b)

(c)

(d)

(e)

RECTANGULAR WAVEGUIDE

RIB WAVEGUIDE

HALF-RIB WAVEGUIDE

WAVELENGTH 1520 nm

WAVELENGTH 1640 nm

WIDTH OF RIB PORTION +30 nm

WIDTH OF RIB PORTION −30 nm

HEIGHT OF SLAB PORTION +20 nm

HEIGHT OF SLAB PORTION −20 nm (a)

(b)

(c)

(d)

(e)

PLANAR OPTICAL WAVEGUIDE DEVICE, DP-QPSK MODULATOR, COHERENT RECEIVER, AND POLARIZATION DIVERSITY

CROSS REFERENCE TO RELATED APPLICATIONS

This application is a continuation application based on a PCT Patent Application No. PCT/JP2015/053770, filed Feb. 12, 2015, whose priority is claimed on Japanese Patent Application No. 2014-077232, filed on Apr. 3, 2014, the entire content of which are hereby incorporated by reference.

BACKGROUND OF THE INVENTION

Field of the Invention

The present invention relates to a planar optical waveguide device.

Description of the Related Art

In recent years, the amount of information transmitted through optical communications has been steadily increasing. To cope with the increase in the amount of information, measures such as increasing a transmission speed, increasing the number of channels based on wavelength multiplexing communication, or the like have advanced. Particularly, in the next generation 100 Gbps digital coherent transmission technology for high speed information communication, a polarization multiplexing method for carrying information in two polarization modes where electric fields are orthogonal to each other is used. By using the polarization multiplexing method, it is possible to double the amount of information per unit time compared with an optical transmission system that uses a single polarization mode.

However, in an optical modulation method for high-speed communication including such a polarization multiplexing method, a structure of an optical modulator becomes complicated, which causes a problem in that the size of an apparatus becomes large and the manufacturing cost increases. In order to solve these problems, research regarding an optical modulator using a planar optical waveguide device has been performed.

As an example of the planar optical waveguide device, there is an optical waveguide element that includes a waveguide that includes a core formed of silicon (Si) on a substrate and a cladding formed of quartz ($SiO_2$) having a refractive index smaller than that of the core. The above-mentioned planar optical waveguide device using Si uses, as its material, Si which can be easily processed and has a high refractive index, and thus, provides advantages such as allowing miniaturization through integration or cost reduction based on mass production.

However, the optical modulator including the polarization multiplexing method using the planar optical waveguide device has the following problems. That is, in the planar optical waveguide device, it is general that a cross-sectional shape of the core that forms the waveguide is asymmetric in a direction parallel to the substrate (width direction) and in a direction perpendicular to the substrate (thickness direction). Thus, a characteristic such as an effective refractive index varies between a polarization mode (referred to as a TE mode) in which a main component of an electric field is present in an in-plane direction of the substrate and a polarization mode (referred to as a TM mode) in which a main component of a magnetic field is present in an in-plane direction of the substrate (in which a main component of an electric field is a vertical direction of the substrate).

In many cases, a $TE_0$ mode and a $TM_0$ mode among the two polarization modes are frequently used. Here, the $TE_0$ mode is a mode in which an effective refractive index is largest in the TE mode, and the $TM_0$ mode is a mode in which an effective refractive index is largest in the TM mode.

However, in a case where an optical modulation operation is performed with respect to polarization modes in which characteristics such as effective refractive indexes are different from each other, it is difficult to perform the optical modulation operation by only using a single planar optical waveguide device. Thus, it is necessary to provide a planar optical waveguide device optimized for each polarization mode. Accordingly, a polarization multiplexing method using a planar optical waveguide device has a problem in that a large amount of effort is necessary for development of the planar optical waveguide device.

In order to solve the problems, a method for using light of the $TE_0$ mode as input light to a planar optical waveguide device designed for the $TE_0$ mode, and polarization-converting light output from the planar optical waveguide device into light of the $TM_0$ mode may be used. Here, "polarization conversion" refers to conversion from the $TE_0$ mode to the $TM_0$ mode or from the $TM_0$ mode to the $TE_0$ mode. In order to perform the optical modulation operation, it is necessary to provide a planar optical waveguide device that performs polarization conversion on a substrate.

In a case where such polarization conversion is performed on the substrate, a technique that combines a conversion from the $TE_0$ mode to the $TE_1$ mode and a conversion from the $TE_1$ mode to the $TM_0$ mode may be used (see Daoxin Dai and John E. Bowers, "Novel concept for ultracompact polarization splitter-rotator based on silicon nanowires," Optics Express, Vol. 19, No. 11, pp. 10940-10949 (2011) (hereinafter, referred to as NPL 1)). The $TE_1$ mode represents a mode having a second largest effective refractive index in the TE mode.

In order to perform such polarization conversion, it is necessary to provide two conversion elements, that is, a conversion element that converts the $TE_0$ mode into the $TE_1$ mode and a conversion element that converts the $TE_1$ mode into the $TM_0$ mode (hereinafter, referred to as a high-order polarization conversion device).

The invention pays attention to the conversion from the $TE_0$ mode into the $TE_1$ mode among the above-mentioned conversions.

Further, in consideration of the conversion, the invention pays attention to general conversion between different modes (hereinafter, referred to as mode conversion, in which an element that performs this conversion is referred to as a mode conversion element). Here, the "mode conversion" represents any one conversion among a conversion between a $TE_i$ mode and a $TE_j$ mode, a conversion between a $TM_i$ mode and a $TM_j$ mode, a conversion between the $TE_i$ mode and the $TM_i$ mode, and a conversion between the $TE_i$ mode and the $TM_j$ mode, with respect to i and j which are integers equal to or greater than 0 (here i≠j). Here, the $TE_i$ mode and the $TE_j$ mode are the (i+1)-th largest effective refractive index mode and (j+1)-th largest effective refractive index mode, respectively, in the TE mode. Further, the $TM_i$ mode and the $TM_j$ mode are a mode having an (i+1)-th largest effective refractive index and a mode having a (j+1)-th largest effective refractive index, respectively, in the TM mode. The mode conversion from the $TE_0$ mode to the $TE_1$ mode corresponds to a case where i=0 and j=1 in the mode conversion from the $TE_i$ mode to the $TE_j$ mode. Hereinafter, two modes that are conversion targets are referred to as target modes.

Regarding a related art relating to mode conversion, there is a mode conversion element as disclosed in Yunhong Ding, Jing Xu, Francesco Da Ros, Bo Huang, Haiyan Ou, and Christophe Peucheret, "On-chip two-mode division multiplexing using tapered directional coupler-based mode multiplexer and demultiplexer," Optics Express, Vol. 21, No. 8, pp. 10376-10382 (2013) (hereinafter, referred to as NPL 2) and Maxim Greenberg and Meir Orenstein, Francesco Da Ros, Bo Huang, Haiyan Ou, and Christophe Peucheret, "Multimode add-drop multiplexing by adiabatic linearly tapered coupling," Optics Express, Vol. 13, No. 23, pp. 9381-9387 (2005) (hereinafter, referred to as NPL 3). Specifically, the mode conversion element disclosed in NPL 2 will be described with reference to FIGS. 44A and 44B. FIG. 44A is a perspective view showing the mode conversion element disclosed in NPL 2, and FIG. 44B is a cross-sectional view of the mode conversion element taken along line $Z_3$-$Z_3$ in FIG. 44A.

The mode conversion element shown in FIGS. 44A and 44B includes a core 203 that forms two parallel waveguides 201 and 202, and a cladding 204 that covers the core 203. The core 203 forms the waveguides 201 and 202 that are formed of Si and are formed to have a cross section of a rectangular shape (so-called rectangular waveguides). The cladding 204 includes a lower cladding 205 formed of $SiO_2$ and an upper cladding 206 formed of an air layer. The waveguides 201 and 202 are formed on an upper surface of the lower cladding 205 to have the same thickness (height). The upper cladding 206 covers the upper surface of the lower cladding 205 on which the waveguides 201 and 202 are formed.

In the mode conversion element shown in FIGS. 44A and 44B, the widths of the waveguides 201 and 202 are different from each other, and the width of the waveguide 202 continuously (in a tapered shape) changes along a light waveguide direction. Thus, a directional coupler in which a waveguide is tapered is configured between an input side and an output side of the two parallel waveguides 201 and 202. In the following description, a directional coupler in which one or both of the two waveguides are formed by a tapered waveguide is referred to as a "tapered directional coupler".

In the mode conversion element shown in FIGS. 44A and 44B, light (indicated by an arrow $TE_0$ in FIG. 44A) that is guided in the $TE_0$ mode is input to one waveguide 201, and is mode-coupled by the tapered directional coupler. Thus, the light that is guided in the $TE_0$ mode is mode-converted into light (indicated by an arrow $TE_1$ in FIG. 44A) that is guided in the $TE_1$ mode, and is output from the other waveguide 202. Accordingly, target modes correspond to the $TE_0$ mode in one waveguide 201 and the $TE_1$ mode in the other waveguide 202.

Here, "mode coupling" means that a part of an electric field penetrates to the outside with respect to a target mode of one waveguide and moves to the other waveguide which is contiguous thereto. In order to efficiently perform the mode coupling, it is necessary that effective refractive indexes of respective target modes in contiguous waveguides are at the same level. The "same level" means that an absolute value of a difference between effective refractive indexes is smaller than $\chi \times$wavelength/$\pi$ using a coupling coefficient $\chi$ (which will be described later). Further, a state where this condition is satisfied is referred to as "phase matching".

Further, in the mode conversion element shown in FIGS. 44A and 44B, light (indicated by an arrow $TE_0'$ in FIG. 44A) that is guided in the $TE_0$ mode is input to the other waveguide 202, and is output from the other waveguide 202 without being mode-converted by the tapered directional coupler. Thus, the light of the $TE_0$ mode and the light of the $TE_1$ mode are simultaneously output from the output end of the other waveguide 202 (hereinafter, referred to as mode multiplexing).

Here, "mode multiplexing" represents that light of a mode (referred to as mode A) generated by mode conversion from one waveguide to the other waveguide and light of a mode (referred to as mode B) which is different from the mode A, input to the other waveguide, are simultaneously output from the other waveguide. In order to output the light of the mode B input to the other waveguide without being mode-converted into a mode different from the mode B in a directional coupler from the other waveguide, it is sufficient if the mode B is not phase-matched with any mode of the one waveguide.

On the other hand, the mode conversion element (mode conversion element using a rib waveguide) disclosed in NPL 3 will be described with reference to FIGS. 45A and 45B. FIG. 45A is a plan view showing the mode conversion element disclosed in NPL 3, and FIG. 45B is a cross-sectional view of the mode conversion element taken along line $Z_4$-$Z_4$ in FIG. 45A.

The mode conversion element shown in FIGS. 45A and 45B includes a core 303 that forms two parallel waveguides 301 and 302, and a cladding 304 that covers the core 303. The core 303 includes rib portions 305 and 306, and a slab portion 307. The rib portions 305 and 306 are formed of Si, and are formed to have a rectangular shape and the same thickness (height). The slab portion 307 is formed of Si and is continuously formed on both sides of the rib portions 305 and 306 in a width direction to have a height lower than those of the rib portions 305 and 306. Thus, the core 303 forms the waveguides (so-called rib-waveguides) 301 and 302 in which the slab portion 307 is provided on both sides of the rib portions 305 and 306 in the width direction.

The cladding 304 includes a lower cladding 308 which is formed of $SiO_2$ and an upper cladding 309 which is formed of an air layer. The waveguides 301 and 302 (the rib portions 305 and 306, and the slab portion 307) are formed on an upper surface of the lower cladding 308. The upper cladding 309 covers an upper surface of the core 303 that forms the rib portions 305 and 306, and the slab portion 307.

In the mode conversion element shown in FIGS. 45A and 45B, the widths of the waveguides 301 and 302 are different from each other. Further, an interval between the curved waveguide 301 and the linear waveguide 302 and the widths of the waveguides 301 and 302 continuously (in a tapered shape) change along a light waveguide direction. Thus, a tapered directional coupler is formed between an input side and an output side of the two parallel waveguides 301 and 302.

In the mode conversion element shown in FIGS. 45A and 45B, light (indicated by an arrow $TE_0$ in FIG. 45A) that is guided in the $TE_0$ mode (the fundamental mode of the "add" waveguide in NPL 3) is input to one waveguide 301, is mode-coupled by the tapered directional coupler, is mode-converted into light (indicated by an arrow $TE_2$ in FIG. 45A) that is guided in a $TE_2$ mode (the third modes of the "bus" waveguide in NPL 3), and is output from the other waveguide 302. Accordingly, the target modes correspond to the $TE_0$ mode in the waveguide 301 and the $TE_2$ mode in the waveguide 302.

However, in the above-described tapered directional coupler, in order to obtain the same level of conversion efficiency in conversion between the same modes (for example, conversion from the $TE_0$ mode to the $TE_1$ mode), a device length is determined depending on the strength of mode coupling between target modes in contiguous waveguides. That is, as the mode coupling becomes stronger, the device length can become shorter.

However, the mode conversion element shown in FIGS. 44A and 44B is the tapered directional coupler that uses the above-described rectangular waveguide, in which the upper cladding 206 is provided between the contiguous waveguides 201 and 202. Thus, a small part of light that is guided by one waveguide 201 penetrates to the outside, and a major part thereof is confined inside. Accordingly, in the tapered directional coupler using the rectangular waveguide, since mode coupling between the target modes in the contiguous waveguides 201 and 202 is weak, the device length becomes long.

On the other hand, the mode conversion element shown in FIGS. 45A and 45B is the tapered directional coupler that uses the above-described rib waveguide, in which the slab portion 307 is provided between the rib portions 305 and 306 that form the waveguides 301 and 302. Thus, light that is guided by one waveguide 301 significantly penetrates from the rib portion 301 to the slab portion 307. Accordingly, in the tapered directional coupler using the rib waveguide, mode coupling between the target modes in the contiguous waveguides 301 and 302 is strong, compared with the tapered directional coupler using the rectangular waveguide.

However, in the tapered directional coupler using the rib waveguide, the slab portion 307 is present on both sides of the rib portions 305 and 306 in the width direction. Thus, light that is guided by one waveguide 301 significantly penetrates to the slab portion 307 which is opposite to the other waveguide 302 with reference to the waveguide 301, as well as to the slab portion 307 (the slab portion 307 between the rib portion 305 and the rib portion 306) on the other waveguide 302 with reference to the waveguide 301. This light does not contribute to mode coupling, which becomes a reason for weakening of the mode coupling.

As described above, in the mode conversion element in the related art, since mode coupling between contiguous waveguides is relatively weak, it is necessary to increase a device length. Particularly, in a planar optical waveguide device in which a core is formed of Si, a high refractive index difference occurs between the core formed of Si and a cladding formed of $SiO_2$ (including an air layer, SiN, or the like). Thus, light confinement to the core is strong, and thus, the above-mentioned problems are noticeable.

In order to solve the above-mentioned problems in the related art, an object of the invention is to provide a planar optical waveguide device capable of reducing a device length to achieve miniaturization, a Dual Polarization-Quadrature Phase Shift Keying (DP-QPSK) modulator, a coherent receiver, and a polarization diversity that use such a plate-type optical waveguide element.

SUMMARY

In order to solve the problems, a planar optical waveguide device according to a first aspect of the invention includes: a substrate; a core that forms a first waveguide and a second waveguide that are arranged in parallel on the substrate; and a cladding that covers the core and has a refractive index smaller than that of the core, in which the core includes a first rib portion that forms the first waveguide, a second rib portion that forms the second waveguide, and a slab portion that is provided only on one side of the first rib portion and the second rib portion in a width direction to have a thickness smaller than the thicknesses of the first rib portion and the second rib portion and is shared between the first rib portion and the second rib portion, the first waveguide and the second waveguide form a mode converting section that is configured to convert a mode of light input to an input side thereof into a mode different from the former mode of the light between the input side and an output side thereof, the mode converting section includes a waveguide structure in which mode coupling is generated between the first waveguide and the second waveguide, an effective refractive index of a first waveguide mode in the first waveguide and an effective refractive index of a second waveguide mode in the second waveguide match each other on at least a cross section perpendicular to a light transmission direction in the waveguide structure, and a magnitude relationship between the effective refractive index of the first waveguide mode and the effective refractive index of the second waveguide mode is switched between the input side and the output side with the one cross section being interposed therebetween.

Also, the first waveguide mode may be a $TE_{(n-1)}$ mode having an n-th largest effective refractive index, and the second waveguide mode may be a $TE_{(m-1)}$ mode having an m-th largest effective refractive index among TE modes in which an electric field is present in an in-plane direction of the substrate.

Here, the n and the m refer natural numbers, in which m>n.

In the above planar optical waveguide device, the n may be 1, and the m may be 2.

In the mode converting section, the width of the first rib portion may continuously decrease along a light waveguide direction, and the width of the second rib portion may continuously increase along the light waveguide direction.

In the mode converting section, the width of the slab portion may be uniform in a length direction.

The mode converting section may include a narrow width portion in which the width of the slab portion is smallest, a width-decreasing portion in which the width of the slab portion continuously decreases toward the narrow width portion from the input side, and a width-increasing portion in which the width of the slab portion continuously increases toward the output side from the narrow width portion.

The thicknesses of the slab portion, the first rib portion, and the second rib portion may be uniform in the length direction.

The thicknesses of the first rib portion and the second rib portion may be the same.

The core may include a bending waveguide having a shape in which an interval between the first rib portion and the second rib portion continuously increases or decreases along a light waveguide direction due to bending at least one of the first rib portion and the second rib portion in a plane, in at least one of the input side and the output side of the mode converting section.

The core may include a tapered waveguide on at least one of the input side and the output side of the mode converting section, in which the tapered waveguide may include a first slab portion that is continuously provided on a side surface of the first rib portion that faces the second rib portion, and a second slab portion that is continuously provided on a side surface of the second rib portion that faces the first rib portion, and the first slab portion and the second slab portion may be provided to be connected to the slab portion and to have a shape in which widths thereof continuously increase toward the slab portion.

In the above planar optical waveguide device, the core may be formed of Si, and the cladding may be formed of $SiO_2$.

In the above planar optical waveguide device, the core may be positioned on the output side of the mode converting section and may have a high-order polarization converting section connected to the second waveguide, and the high-order polarization mode-converting section may mode-convert light that is guided in a $TE_1$ mode output from the second waveguide into light that is guided in a $TM_0$ mode having the largest effective refractive index for output, among TM modes where a magnetic field is present in an in-plane direction of the substrate.

A DP-QPSK modulator according to a second aspect of the invention includes the planar optical waveguide device according to the first aspect of the invention.

A coherent receiver according to a third aspect of the invention includes the planar optical waveguide device according to the first aspect of the invention.

A polarization diversity according to a fourth aspect of the invention includes the planar optical waveguide device according to the first aspect of the invention.

As described above, according to the aspects of the invention, it is possible to provide a planar optical waveguide device capable of reducing a device length to achieve miniaturization, and a DP-QPSK modulator, a coherent receiver and a polarization diversity system that use such a planar optical waveguide device.

DETAILED DESCRIPTION OF THE PREFERRED EMBODIMENTS

Hereinafter, embodiments of the invention will be described in detail with reference to the accompanying drawings.

In the following entire drawings, in order to easily show respective components, scales of sizes may be differently set according to the components. Further, in the following description, materials, sizes, or the like are only examples, and the invention is not limited thereto, and appropriate modifications may be made in a range without departing from the concept of the invention.

(Planar Optical Waveguide Device)

Figure 1A:
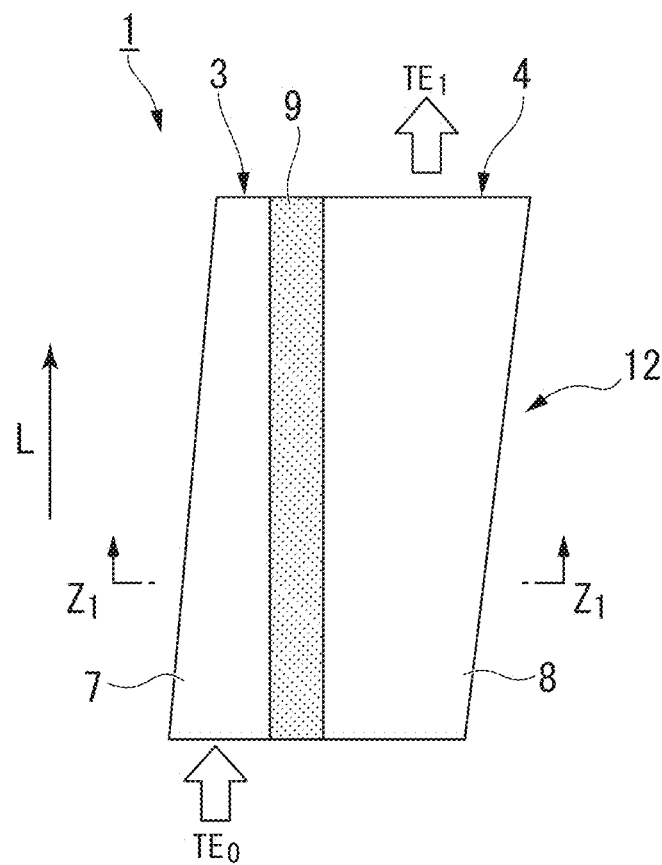
FIG. 1A is a plan view of a planar optical waveguide device according to an embodiment of the invention.

First, as an embodiment of the invention, for example, a planar optical waveguide device 1 shown in FIGS. 1A and 1B will be described. FIG. 1A is a plan view showing the planar optical waveguide device 1, and FIG. 1B is a sectional view of the planar optical waveguide device 1 taken along line $Z_1$-$Z_1$ in FIG. 1A.

Figure 1B:
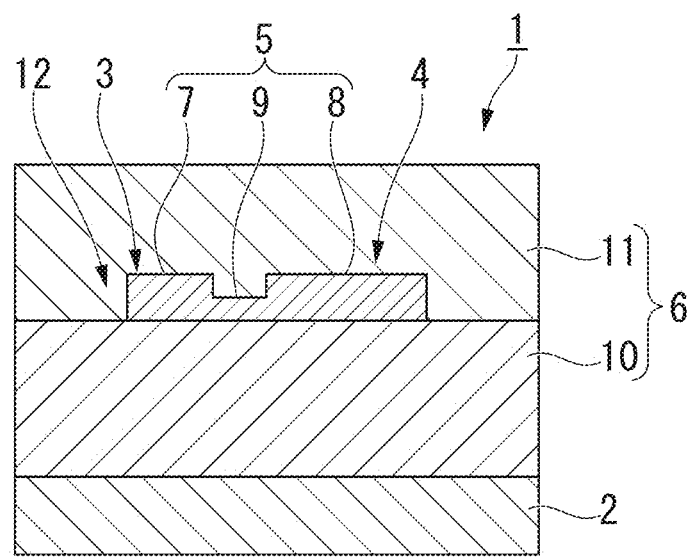
FIG. 1B is a sectional view of the planar optical waveguide device according to the embodiment of the invention.

The planar optical waveguide device 1 shown in FIGS. 1A and 1B includes a core 5 that forms a first waveguide 3 and a second waveguide 4 which are arranged in parallel above a substrate 2, and a cladding 6 that covers the core 5 and has a refractive index smaller than that of the core 5.

The planar optical waveguide device 1 may be manufactured using a silicon-on insulator (SOI) wafer formed of Si—SiO$_2$—Si, for example. Specifically, the core 5 (the first waveguide 3 and the second waveguide 4) may be formed by processing an Si layer which is an uppermost layer of the SOI wafer. In a case where the SOI wafer is used, an Si layer which is a lowermost layer becomes the substrate 2, and an intermediate SiO$_2$ layer becomes a lower cladding 10 (which will be described later).

The core 5 includes a first rib portion 7, a second rib portion 8, and a slab portion 9. The first rib portion 7 forms the first waveguide 3. The second rib portion 8 forms the second waveguide 4. The slab portion 9 is shared between the first rib portion 7 and the second rib portion 8. The thickness (height) of the slab portion 9 is smaller than those of the first rib portion 7 and the second rib portion 8.

The core 5 (the first rib portion 7, the second rib portion 8, and the slab portion 9) is formed of a material having a refractive index higher than that of the cladding 6, and preferably, is formed of Si. In the planar optical waveguide device 1, by etching the Si layer which is the uppermost layer of the above-mentioned SOI wafer in two stages, it is possible to integrally form the first rib 7, the second rib portion 8, and the slab portion 9.

The first rib portion 7 and the second rib portion 8 are formed to have the same thickness (height) and a cross section of a rectangular shape. The slab portion 9 is formed along between side surfaces of the first rib portion 7 and the second rib portion 8 that face each other. Thus, the first waveguide 3 and the second waveguide 4 form a waveguide (so-called half-rib waveguide) in which the slab portion 9 is provided only on one side of the first rib portion 7 and the second rib portion 8 in a width direction.

The cladding 6 includes a lower cladding 10 and an upper cladding 11. The first waveguide 3 and the second waveguide 4 (the first rib portion 7, the second rib portion 8, and the slab portion 9) are formed on a surface of the lower cladding 10. The upper cladding 11 covers the surface of the lower cladding 10 on which the first rib portion 7, the second rib portion 8, and the slab portion 9 are formed.

The cladding 6 is formed of a material having a refractive index lower than that of the core 5, and specifically, is formed of $SiO_2$, SiN, an air layer (in which the air layer may be applied only to the upper cladding 11), or the like. In the planar optical waveguide device 1, the $SiO_2$ layer of the above-mentioned SOI forms the lower cladding 10, and an air layer forms the upper cladding 11 thereon. Further, the upper cladding 11 may be formed by an $SiO_2$ layer that covers the surface of the lower cladding 10.

The first waveguide 3 and the second waveguide 4 includes a mode converter (mode conversion element) 12 that converts a mode of light input to an input side thereof into a mode different from the mode of the light, between the input side and an output side thereof. The mode converter 12 has a waveguide structure in which mode coupling occurs between the first waveguide 3 and the second waveguide 4.

Specifically, as the waveguide structure in which mode coupling occurs, for example, a waveguide structure in which the widths or thicknesses (heights) of the first rib portion 7 and the second rib portion 8, the thickness (height) of the slab portion 9, or the like, are continuously changed along a light waveguide direction L may be used. Effective refractive indexes are associated with confinement of light to the core 5 (the first waveguide 3 and the second waveguide 4). That is, in the first waveguide 3 and the second waveguide 4, as the widths or thicknesses (heights) of the first rib portion 7 and the second rib portion 8 become larger, the effective refractive indexes become larger. Further, as the widths or thicknesses (heights) of the first rib portion 7 and the second rib portion 8 become smaller, the effective refractive indexes become smaller.

Accordingly, by changing the above-mentioned waveguide structure, it is possible to adjust the effective refractive indexes of modes of lights that are guided by the first waveguide 3 and the second waveguide 4. Particularly, in a case where the effective refractive indexes are adjusted by changing only the widths of the first rib portion 7 and the second rib portion 8 in a state where the thicknesses (heights) of the first rib portion 7, the second rib portion 8 and the slab portion 9 are set to be uniform in a length direction of the first waveguide 3 and the second waveguide 4, it is possible to easily perform the manufacturing based on the processing of the SOI wafer described above, and thus, it is possible to effectively perform the manufacturing.

In the mode converter 12, the width of the first rib portion 7 continuously decreases along the light waveguide direction L, and the width of the second rib portion 8 continuously increases along the light waveguide direction L. On the other hand, the width of the slab portion 9 is uniform in the length direction of the first rib portion 7 and the second rib portion 8. Thus, a tapered directional coupler that uses a half-rib waveguide is formed between the output side and the input side of the first waveguide 3 and the second waveguide 4.

In the mode converter 12, due to the above-described waveguide structure, effective refractive indexes of a first waveguide mode in the first waveguide 3 and a second waveguide mode in the second waveguide 4 match each other in at least one cross section perpendicular to a light transmission direction in the waveguide structure. Further, a magnitude relationship between the effective refractive index of the first waveguide mode and the effective refractive index of the second waveguide mode is switched between the input side and the output side thereof with the one cross section being interposed therebetween.

In the planar optical waveguide device 1, the first waveguide mode refers to a $TE_{(n-1)}$ mode having an n-th largest effective refractive index (n is a natural number). On the other hand, the second waveguide mode refers to a $TE_{(m-1)}$ mode having an m-th largest effective refractive index (m is a natural number, in which m>n). Specifically, the first waveguide mode in this embodiment is a $TE_0$ mode (n=1) (indicated by arrow $TE_0$ in FIG. 1A). The second waveguide mode is a $TE_1$ mode (m=2) (indicated by arrow $TE_1$ in FIG. 1A).

As described above, in the planar optical waveguide device 1 of this embodiment, in the above-described mode converter 12, the tapered directional coupler that uses the half-rib waveguide is configured. In the tapered directional coupler that uses the half-rib waveguide, the slab portion 9 is provided between the first rib portion 7 that forms the first waveguide 3 and the second rib portion 8 that forms the second waveguide 4. Thus, light that is guided by the first waveguide 3 significantly penetrates from the first rib portion 7 to the slab portion 9. On the other hand, the slab portion 9 is present only between the first rib portion and the second rib portion 8. Thus, the light that is guided by the first waveguide 3 does not easily penetrate to a side opposite to a side where the slab portion 9 is provided with reference to the first rib portion 7. Accordingly, it is possible to reduce a light portion that does not contribute to mode coupling in the light that is guided by the first waveguide 3.

Thus, in the tapered directional coupler using the half-rib waveguide, the strength of mode coupling is enhanced compared with that of the tapered directional coupler using the above-described rib waveguide. Thus, it is possible to enhance the conversion efficiency per unit length, to thereby achieve highly efficient mode conversion. As a result, it is possible to shorten a device length, and thus, it is possible to achieve miniaturization of the planar optical waveguide device 1 (the mode converter 12).

(Tapered Directional Coupler Using Half-Rib Waveguide)

Next, the tapered directional coupler using the half-rib waveguide will be described.

In the following description, the same reference numerals are given to the same portions as those of the planar optical waveguide device 1 in the accompanying drawings or the like as necessary.

In a case where contiguous waveguides are phase-matched, the length of waveguides necessary for light penetrating from one waveguide to shift to the other waveguide depends on a coupling coefficient $\chi$ indicating the strength of mode coupling. The coupling coefficient $\chi$ is expressed as the following expression (1).

[Expression 1]

$$\chi \propto \int_{-\infty}^{\infty}\int_{-\infty}^{\infty}(N^2-N_1^2)E_1^* \cdot E_2 dxdy \text{ or } \int_{-\infty}^{\infty}\int_{-\infty}^{\infty}(N^2-N_2^2)E_1 \cdot E_2^* dxdy \quad (1)$$

In Expression (1), $E_i$ (i=1, 2) represents electric field vectors of modes of coupling targets that are guided by two contiguous waveguides i (i=1, 2), N represents a refractive index distribution when the two waveguides are contiguous, $N_i$ represents a refractive index distribution when a waveguide i is independently present, and coordinates x, y represent a width direction and a height direction, respectively.

It can be understood from Expression (1) that on a core cross section of one of two contiguous waveguides, since inner products of electric fields of the both modes are integrated, coupling between the waveguides becomes stronger as light penetrating from a rib portion of a core to the outside thereof becomes larger. As described later, as the coupling coefficient χ becomes larger, it is possible to perform mode conversion based on the mode coupling at a short distance with high efficiency.

Then, mode conversion from the $TE_0$ mode to the $TE_1$ mode based on the tapered directional coupler using the half-rib waveguide is considered.

In the following description, the first waveguide 3 through which light of the $TE_0$ mode which is a coupling target is referred to as a "waveguide 1", and the second waveguide 4 through which light of the $TE_1$ mode which is a coupling target is referred to as a "waveguide 2".

Figure 2A:
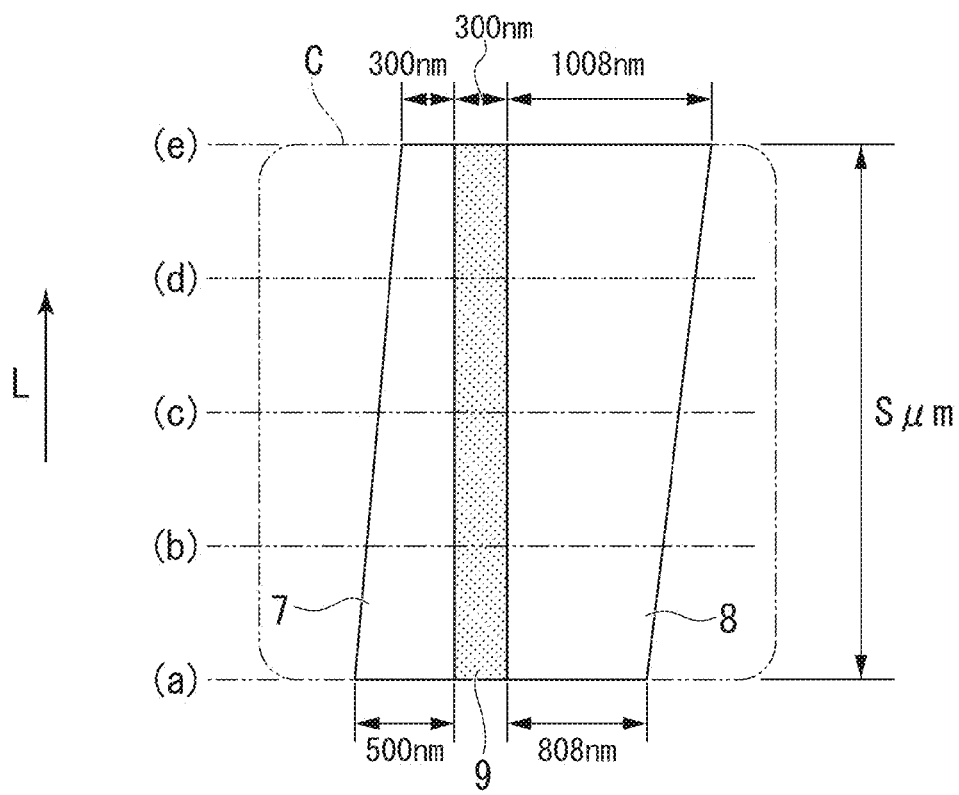
FIG. 2A is a plan view of a tapered directional coupler using a half-rib waveguide, which shows an example of the sizes of respective portions.
Figure 2B:
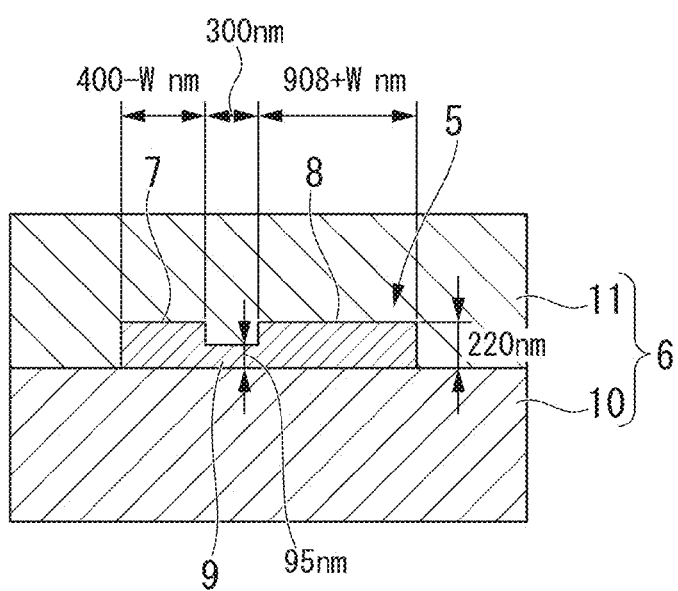
FIG. 2B is a sectional view of the tapered directional coupler using the half-rib waveguide, which shows an example of the sizes of respective portions.

Also, the sizes of respective portions of the tapered directional coupler using the half-rib waveguide are shown in FIGS. 2A and 2B. FIG. 2A is a plan view showing an example of the sizes of the respective portions of the tapered directional coupler using the half-rib waveguide. FIG. 2B is a cross-sectional view showing the example of the sizes of the respective portions of the tapered directional coupler using the half-rib waveguide.

With respect to the tapered directional coupler using the half-rib waveguide, as shown in FIGS. 2A and 2B, the core 5 (the rib portions 7 and 8, and the slab portion 9) is formed of Si (having a refractive index of 3.48 (at a wavelength of 1580 nm)), and the cladding 6 (the lower cladding 10 and the upper cladding 11) is formed of $SiO_2$ (having a refractive index of 1.44 (at the wavelength of 1580 nm)). Also, the thicknesses (heights) of the rib portions 7 and 8 are 220 nm, and the thickness (height) of the slab portion 9 is 95 nm. Furthermore, an interval (the width of the slab portion 9) between the rib portions 7 and 8 is 300 nm and is uniform in the length direction thereof. In addition, the width of the first rib portion 7 is 400-W [nm], and the width of the second rib portion 8 is 908+W [nm] (−100≤W≤100). Further, the waveguides 1 and 2 are tapered along the light waveguide direction so that the width of the first rib portion 7 decreases at specific intervals and the width of the second rib portion 8 increases at specific intervals, between a cross-sectional position (a) (position of W=−100) of a starting edge and a cross-sectional position (e) (position of W=+100) of an ending edge. The length (referred to as a taper length) of the tapered portion is expressed as S μm. The width of the first rip portion 7 and the width of the second rib portion 8 are phase-matched in the vicinity of an intermediate cross-sectional position (c) (position of W=0) thereof. Here, the cross-sectional position (b) is provided at a middle position (position of W=−50) between the cross-sectional position (a) and the cross-sectional position (c), and a cross-sectional position (d) is provided at a middle position (position of W=+50) between the cross-sectional position (c) and a cross-sectional position (e).

Figure 3A:
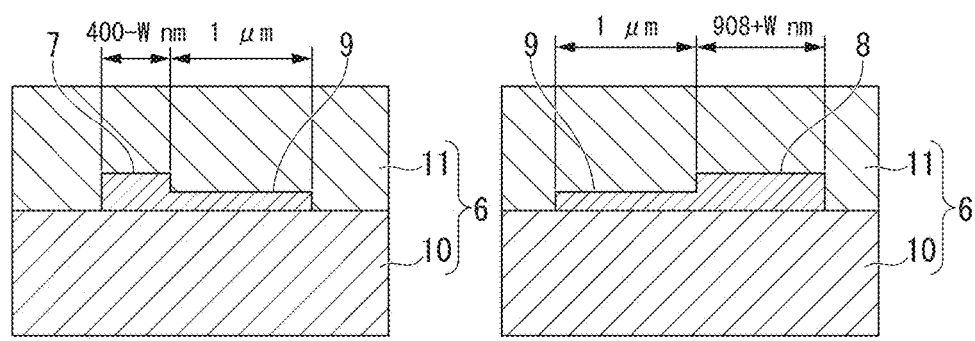
FIG. 3A is a sectional view showing the sizes of respective portions with respect to a waveguide 1 and a waveguide 2 when calculating changes of effective refractive indexes with respect to W when the waveguide 1 and the waveguide 2 are independently present through a simulation.

First, with respect to the tapered directional coupler using the half-rib waveguide shown in FIGS. 2A and 2B, effective refractive indexes when the $TE_0$ mode of the waveguide 1 and the $TE_1$ mode of the waveguide 2 are phase-matched were calculated through a simulation based on a finite element method (FEM). In calculation, a structure in which the waveguide 1 and the waveguide 2 are independently present was assumed. The structure used in this case is as shown in FIG. 3A. Specifically, in this simulation, the wavelength was set to 1580 nm, the width of the rib portion of the waveguide 1 was set to 400 nm, the width of the rib portion of the waveguide 2 was set to 908 nm, and the width of the slab portion was set to 1 (corresponding to a case where W=0 in FIG. 3A). Its calculation result is shown in the following Table 1.

TABLE 1

| | Waveguide 1 | Waveguide 2 |
|---|---|---|
| A (nm) | 400 | 908 |
| Effective refractive index | 2.360637188 ($TE_0$) | 2.360531569 ($TE_1$) |

In this simulation, a difference between the effective refractive indexes of the $TE_0$ mode of the waveguide 1 and the $TE_1$ mode of the waveguide 2 was about $1.06 \times 10^{-4}$. A coupling coefficient χ of the respective modes when the waveguide 1 and the waveguide 2 are contiguous at a width of 300 nm was 0.163356 [rad/μm]. Since this satisfies a relationship of χ×wavelength/π (=0.08216)>>effective refractive index difference ($\cong 1.06 \times 10^{-4}$), it can be said that the effective refractive indexes in the $TE_0$ mode and the $TE_1$ mode calculated through the simulation are the same. That is, it can be said that the modes are phase-matched.

Then, the waveguide structure (for example, the width of the rib portion, or the like) of the waveguide 1 and the waveguide 2 which are contiguous is continuously changed (that is, tapered) along the light waveguide direction according to a phase matching condition calculated through the simulation. Thus, until mode coupling is not almost performed on an input side and an output side of the tapered directional coupler, the phase matching condition is intentionally broken. Then, the phase matching condition between the input side and the output side is satisfied.

Here, as a tapering condition, a condition that the sizes of effective refractive indexes of two coupling targets modes are switched before and after a waveguide structure in which the phase matching condition is satisfied. By satisfying such a condition, mode coupling is gradually performed along the light waveguide direction from the input side toward the output side. Further, by sufficiently increasing the length of the taper, it is possible to achieve mode conversion with almost no loss. Here, as the coupling coefficient χ becomes larger, more efficient mode conversion can be achieved, and thus, it is possible to shorten the device length.

In a method for adjusting an effective refractive index by changing the width of a waveguide, as the size of the waveguide becomes larger, confinement of light to a core becomes lager, and thus, the influence of a refractive index of the core strongly acts. Thus, a phenomenon such that the effective refractive index increases is used, for example.

Figure 3B:
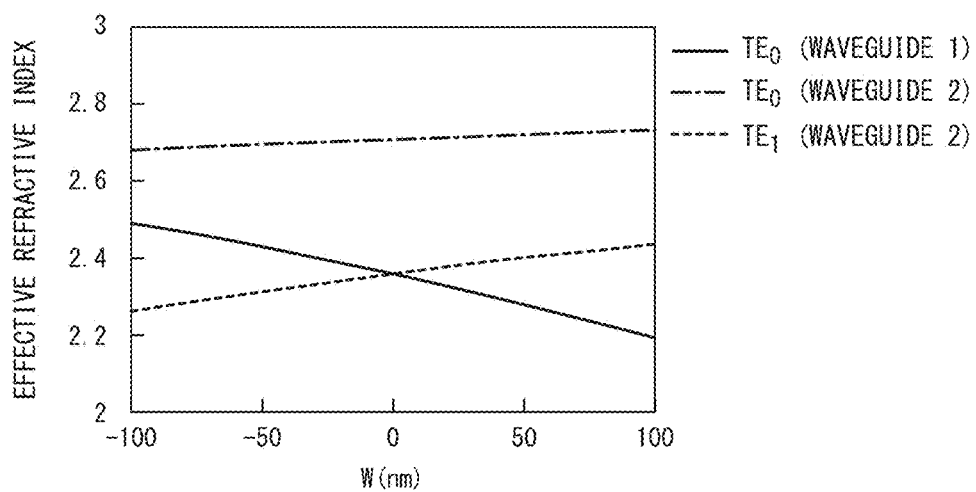
FIG. 3B is a graph showing results obtained by calculating the changes of effective refractive indexes with respect to W when the waveguide 1 and the waveguide 2 are independently present through a simulation.

Then, with respect to the tapered directional coupler using the half-rib waveguide, when the waveguides 1 and 2 are tapered, since it is confirmed that the phase matching condition is broken before and after the cross-sectional position (c) where phase matching is performed, changes in respective effective refractive indexes with respect to W when the waveguide 1 and the waveguide 2 are independently present were calculated through a simulation. Specifically, in this simulation, as shown in FIG. 3A, the calculation was performed, respectively, in a case where the half-rib waveguide in which the slab portion 9 was provided was independently present on one side of the first rib portion 7 in the width direction with respect to the waveguide 1, and in a case where the half-rib waveguide in which the slab portion 9 was provided was independently present on one side of the second rib portion 8 in the width direction with respect to the waveguide 2. Also, in both cases, the calculation was performed in a state where the width of the slab portion 9 was 1 µm and the wavelength was 1580 nm. FIG. 3B is a graph showing its result. In the graph of FIG. 3B, an effective refractive index of a $TE_0$ mode of light that is guided by the waveguide 1 is indicated by a solid line, an effective refractive index of a $TE_0$ mode of light that is guided by the waveguide 2 is indicated by a dotted line, and an effective refractive index of a $TE_1$ mode of light that is guided by the waveguide 2 is indicated by a broken line.

In the graph shown in FIG. 3B, it can be understood that the effective refractive index of the $TE_0$ mode of the light that is guided by the waveguide 1 and the effective refractive index of the $TE_1$ mode of the light that is guided by the waveguide 2 are the same (match each other) in the vicinity of W=0 and are phase-matched therein. On the other hand, if W becomes distant from 0, a difference occurs between the effective refractive indexes, and the phase matching condition is broken.

Specifically, the effective refractive index difference corresponding to Table 1 at the position of W=−100 is 0.2286, and $\chi \times$wavelength/$\pi$ becomes 0.07844. Further, the effective refractive index difference corresponding to Table 1 at the position of W=+100 is 0.2442, and $\chi \times$wavelength/$\pi$ becomes 0.08061. Accordingly, it can be understood that since the effective refractive index is large with respect to the coupling coefficient $\chi$ indicating the strength of coupling, the phase matching condition is significantly broken.

Generally, since the effective refractive index difference corresponds to a phase rate difference between the respective modes, if the effective refractive index difference becomes larger, phase deviation with respect to a light travel direction becomes larger, which results in an electric field distribution that locally present in one waveguide independently of the other waveguide. Thus, it can be understood from this simulation that mode separation is possible before and after the mode conversion.

Figure 4:
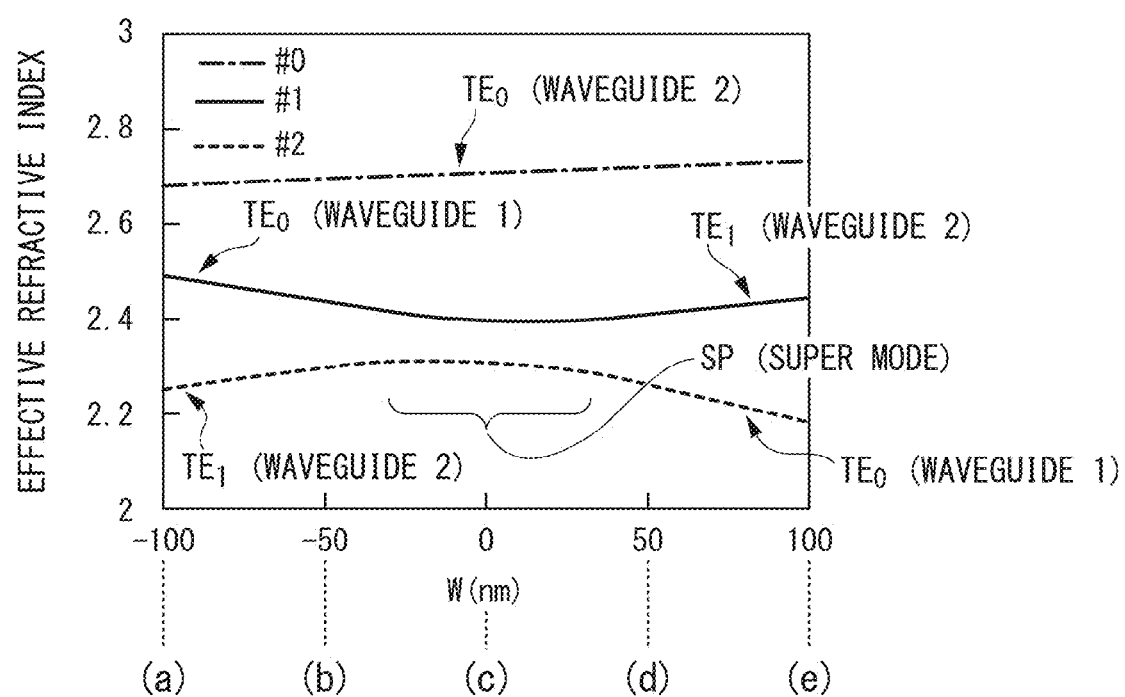
FIG. 4 is a graph obtained by calculating changes of effective refractive indexes with respect to W when a waveguide 1 and a waveguide 2 are contiguous to each other through a simulation.

Then, a graph obtained by calculating changes of effective refractive indexes with respect to W when the waveguide 1 and the waveguide 2 are contiguous is shown in FIG. 4. In this simulation, calculation was performed at a wavelength of 1580 nm. Further, in the graph shown in FIG. 4, #0 indicated by a dotted line represents an effective refractive index of a first mode among modes of lights that are guided by the waveguide 1 and the waveguide 2. #1 indicated by a solid line represents an effective refractive index of a second mode among the modes of the light that is guided by the waveguide 1 and the waveguide 2. #2 indicated by a broken line represents an effective refractive index of a third mode among the modes of the light that is guided by the waveguide 1 and the waveguide 2. In the graph of FIG. 4, cross-sectional positions (a) to (e) with respect to W are shown on the transverse axis.

In the graph shown in FIG. 4, compared with the graph shown in FIG. 3B, it can be understood that #1 and #2 are separated in the vicinity of W=0 without intersection. This is because phase matching of the effective refractive index of the $TE_0$ mode of light that is guided by the waveguide 1 and the effective refractive index of the $TE_1$ mode of light that is guided by the waveguide 2 is satisfied and two modes mutually act on each other according to mode coupling. Here, a so-called super mode (in the vicinity of a region indicated by SP in FIG. 4) where different modes are mixedly present is formed.

On the other hand, if W becomes distant from 0, the phase matching condition is not satisfied. Thus, the mutual action does not occur, and an electric field distribution of the same modes as in a case where the waveguide 1 and the waveguide 2 are independently present is obtained. As a result, the effective refractive indexes are not significantly changed compared with a case where the waveguide 1 and the waveguide 2 are independently present.

The magnitude relationship between the effective refractive index of the $TE_0$ mode of light that is guided by the waveguide 1 and the effective refractive index of the $TE_1$ mode of light that is guided by the waveguide 2 is switched between W<0 and W>0. Thus, light for which strong mode coupling is performed in the vicinity of W=0 is converted into a mode distribution in which the $TE_0$ mode is present in the waveguide 1 and a mode distribution in which the $TE_1$ mode is present in the waveguide 2 before and after W=0.

On the other hand, in the tapered directional coupler, it is known that if the waveguide structure is gradually changed in the light waveguide direction, mode conversion is performed so as to change along a curve of one effective refractive index (referred to as an adiabatic change). Thus, in the graph of FIG. 4, the light that is guided in the $TE_0$ mode is input to the starting edge (W=−100) of the waveguide 1, is mode-converted into light that is guided in the $TE_1$ mode due to mode coupling based on a super mode in the middle thereof (W=0), and is output from the ending edge (W=+100) of the waveguide 2.

In order to confirm such a configuration, graphs obtained by calculating an $E_x$ component of the electric field distribution of #1 for each of cross-sectional positions (a) to (e) with respect to W are shown in FIGS. 5 to 9. In the graphs shown in FIGS. 5 to 9, the coordinates x and y represent a width direction and a height direction, respectively. Also, simulation conditions are the same as in the case shown in FIG. 4. In addition, in FIGS. 5 to 9, a contour line of the cross section of the core 5 (the rib portion 7 and 8, and the slab portion 9) shown in FIG. 2B is also shown.

Figure 5:
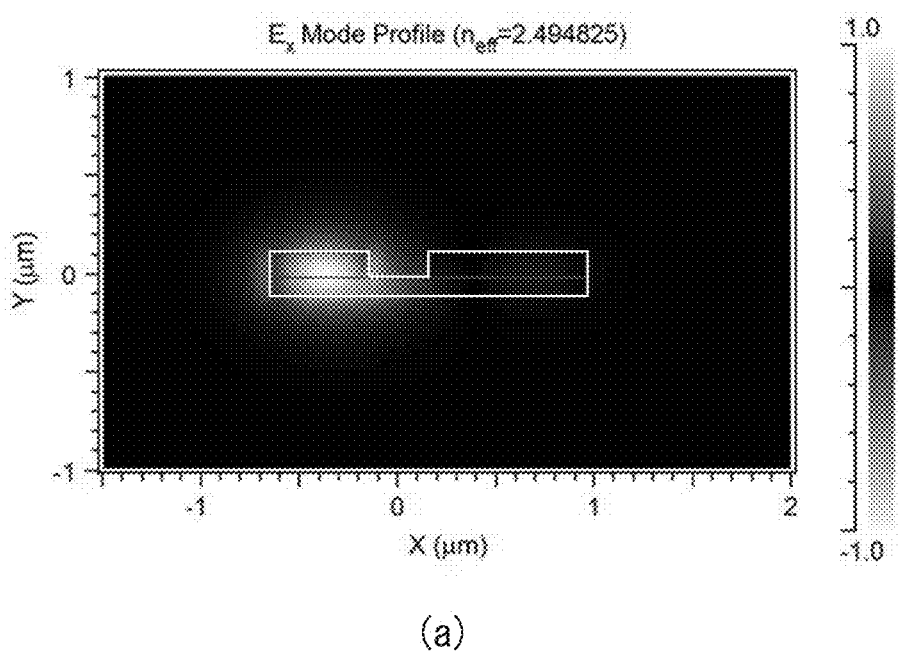
FIG. 5 is a graph obtained by calculating an $E_x$ component of an electric field distribution of #1 mode at a cross-sectional position (a) of W=−100 through a simulation.
Figure 6:
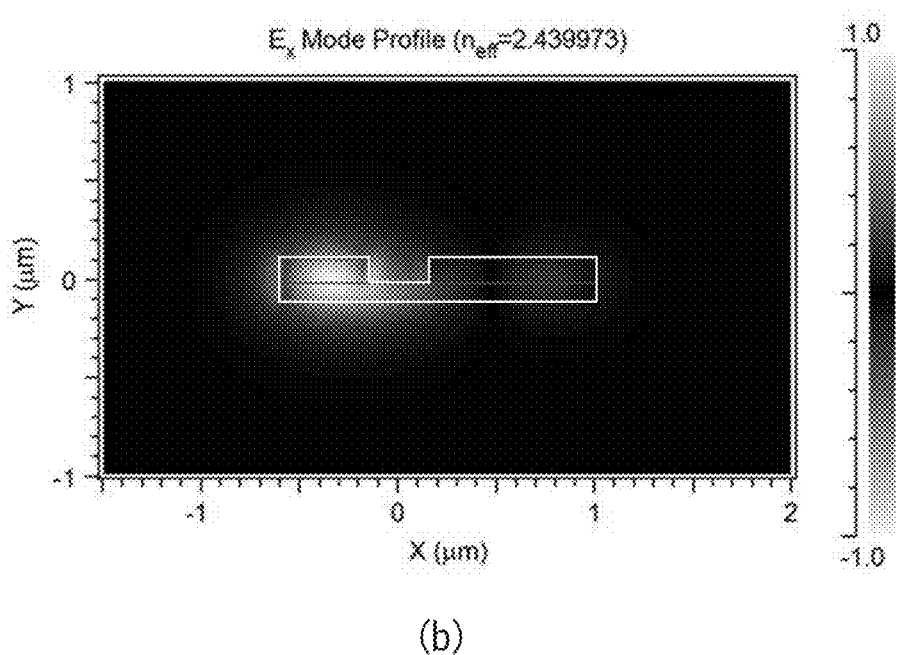
FIG. 6 is a graph obtained by calculating an $E_x$ component of an electric field distribution of #1 mode at a cross-sectional position (b) of W=−50 through a simulation.
Figure 7:
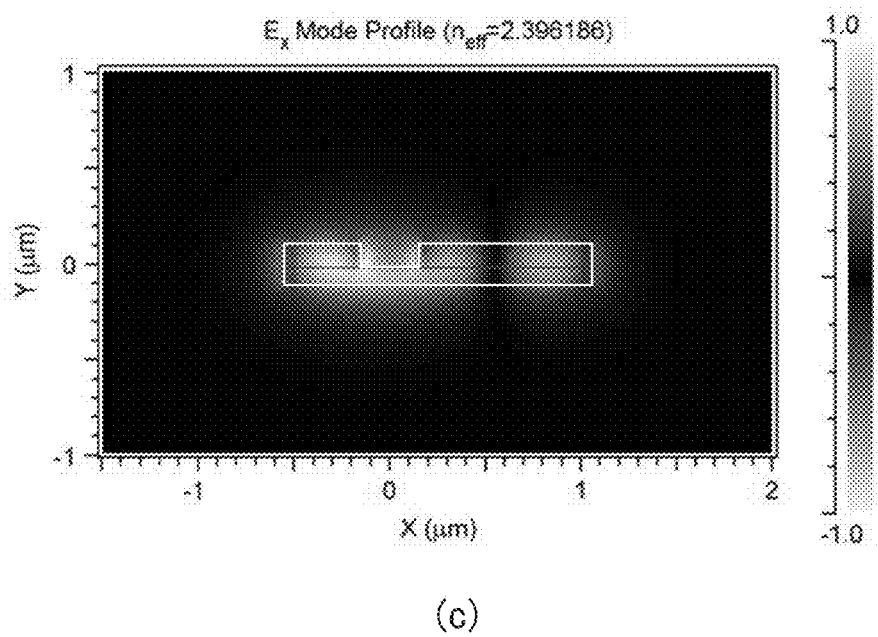
FIG. 7 is a graph obtained by calculating an $E_x$ component of an electric field distribution of #1 mode at a cross-sectional position (c) of W=0 through a simulation.
Figure 8:
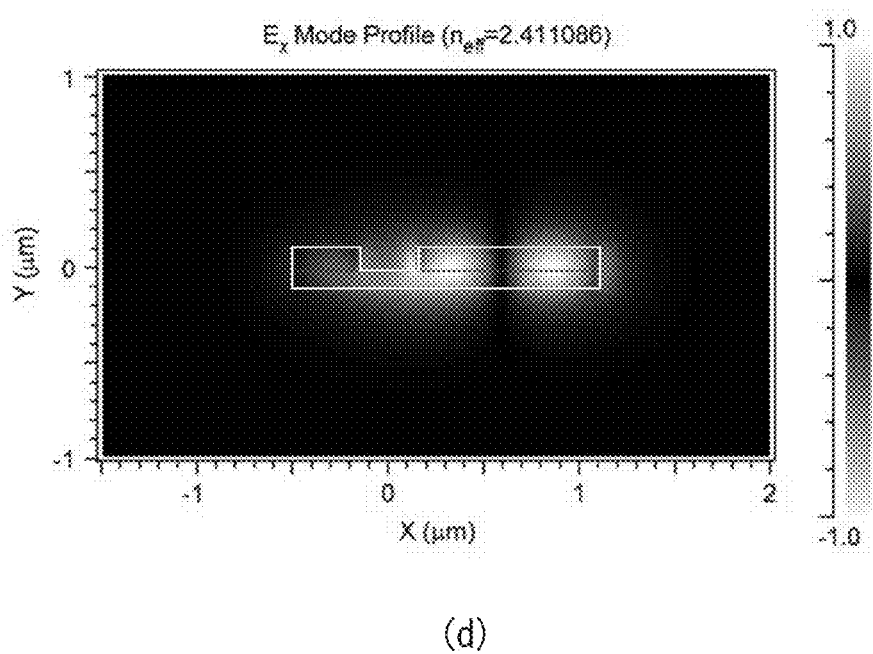
FIG. 8 is a graph obtained by calculating an $E_x$ component of an electric field distribution of #1 mode at a cross-sectional position (d) of W=+50 through a simulation.

At the cross-sectional position (a) of W=−100 shown in FIG. 5, light that is guided in the $TE_0$ mode is present in the waveguide 1. At the cross-sectional position (b) of W=−50 shown in FIG. 6, mode coupling is gradually performed from the $TE_0$ mode of the waveguide 1 to the $TE_1$ mode of the waveguide 2. At the cross-sectional position (c) of W=0 shown in FIG. 7, since a phase matching condition is satisfied, a mode distribution is made such that the $TE_0$ mode of the waveguide 1 and the $TE_1$ mode of the waveguide 2 are mixedly present is obtained. At the cross-sectional position (d) of W=+50 shown in FIG. 8, since the effective refractive index of the $TE_1$ mode in which light is guided by the waveguide 2 is larger than the effective refractive index of the $TE_0$ mode in which light is guided by the waveguide 1, the mode shifts to the $TE_1$ mode of the waveguide 2. At the cross-sectional position (e) of W=+100 shown in FIG. 8, light is mode-converted into light that is guided by the waveguide 2 in the $TE_1$ mode.

Here, in the tapered directional coupler, if the lengths of the waveguides 1 and 2 are sufficiently long and the widths of the waveguides 1 and 2 are not gradually changed (tapered), a part of a mode having a certain effective refractive index is converted into a mode having another effective refractive index from an effective refractive index curve thereof, or into a radiation mode. Accordingly, the conversion into another mode results in light loss as it is. Thus, with respect to the waveguides 1 and 2, it is necessary to take a sufficient taper length. Further, conversion into another mode easily occurs in a case where the effective refractive index curves are close to each other. Accordingly, it is necessary to take a long taper length at a portion where the effective refractive index curves are closest to each other, and in this case, the portion determines the entire size.

In the taper directional coupler, at the cross-sectional position (c) of W=0, in a case where the waveguides 1 and 2 are independently present, modes of which target effective refractive indexes match each other deviates from the matching due to mode coupling when the waveguides 1 and 2 are contiguous. Thus, as in the graph shown in FIG. 4, the effective refractive index curves are closest to each other at the cross-sectional position (c). In addition, if the effective refractive index curves are significantly separated from each other at this position, the taper length for obtaining a desired characteristic is shortened. The separation of the effective refractive indexes at this position generally becomes larger as mode coupling becomes stronger.

That is, as the coupling coefficient $\chi$ becomes larger, the separation of the effective refractive indexes becomes larger. Thus, as penetration of light to a contiguous waveguide becomes larger, the taper length of the tapered directional coupler becomes shorter.

(Comparison Between Half-Rib Waveguide, and Rectangular Waveguide and Rib Waveguide)

Then, comparison between a tapered directional coupler using a half-rib waveguide, and a tapered directional coupler using a rectangular waveguide and a tapered directional coupler using a rib waveguide is performed.

Figure 44A:
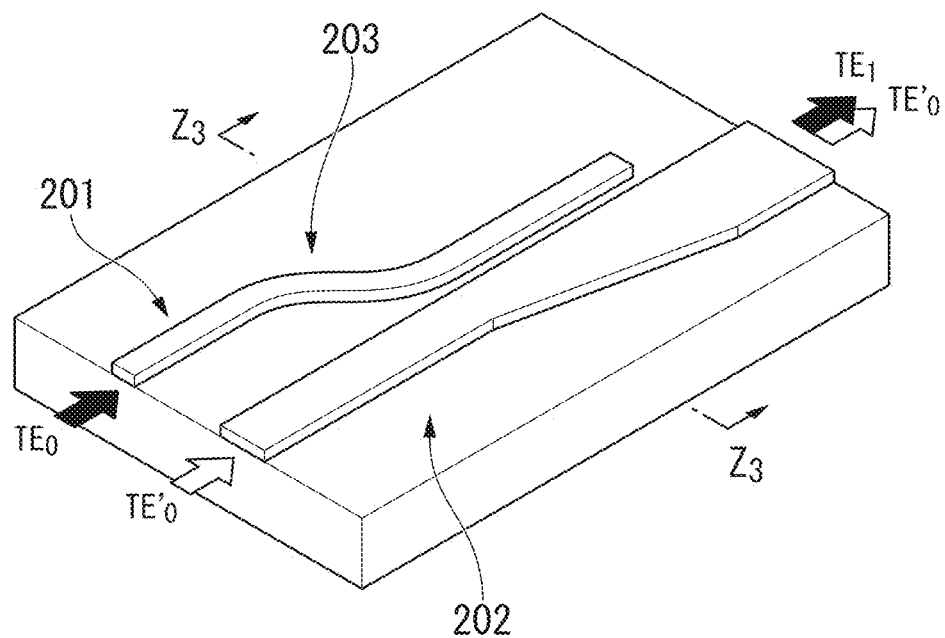
FIG. 44A shows a perspective view of an example of a mode conversion element using the rectangular waveguide in the related art.
Figure 44B:
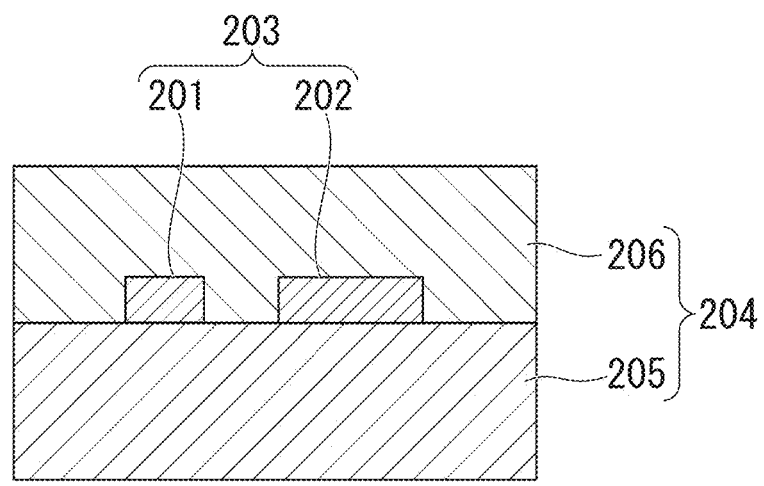
FIG. 44B shows a sectional view of an example of a mode conversion element using the rectangular waveguide in the related art.
Figure 45A:
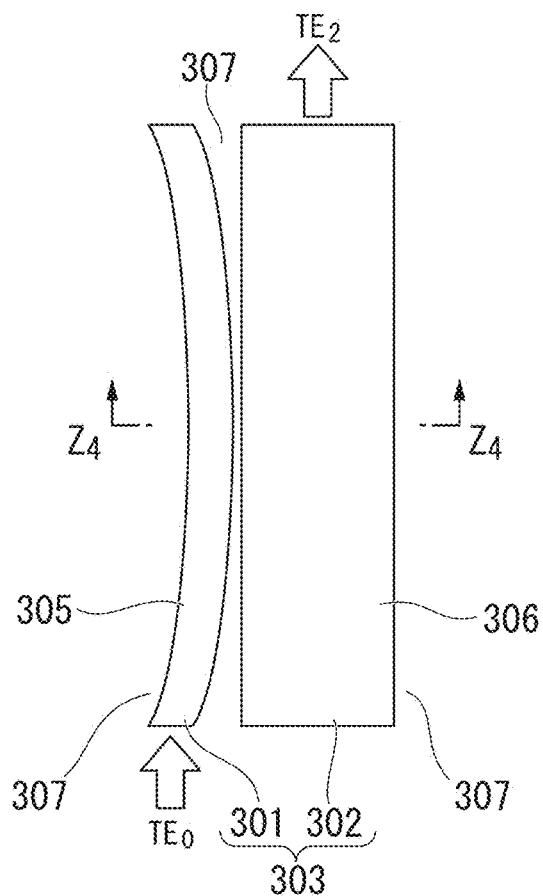
FIG. 45A is a plan view of an example of a mode conversion element using the rib waveguide in the related art.
Figure 45B:
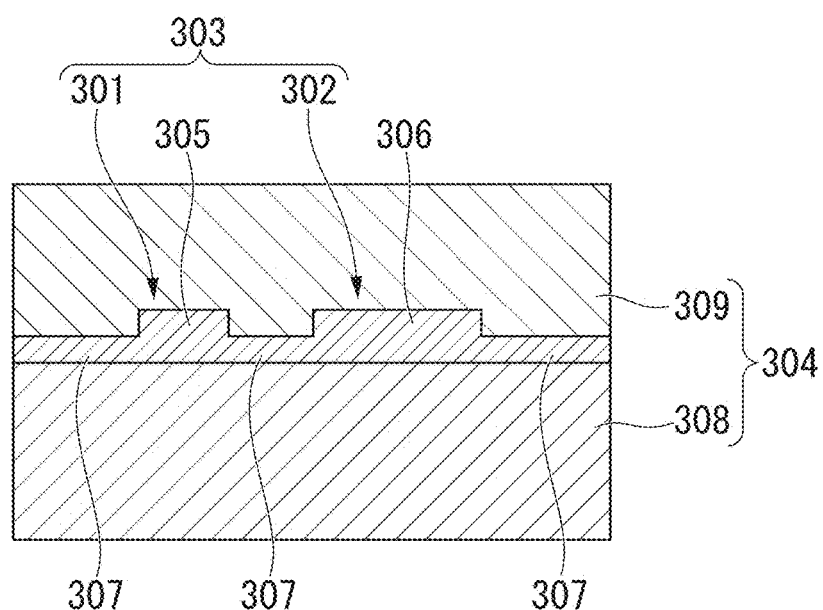
FIG. 45B shows a sectional view of an example of the mode conversion element using the rib waveguide in the related art.

The rectangular waveguide (see FIG. 44B) has been frequently used in a normal planar optical waveguide device in view of strong confinement. Further, the rib waveguide (see FIG. 45B) has been widely used in that it is possible to reduce the influence of roughness of a sidewall of the waveguide compared with that of the rectangular waveguide. On the other hand, the half-rib waveguide (see FIG. 1B) does not sufficiently achieve the respective effects due to its structure in which the rectangular waveguide and the rib waveguide are combined, and thus, has not been generally used in the related art.

In the invention, it was found that such a half-rib waveguide had a significant effect in view of mode coupling between different modes. Accordingly, by using the half-rib waveguide in a tapered directional coupler, it is possible to achieve highly efficient mode conversion, and to achieve miniaturization of a planar optical waveguide device.

Figure 10:
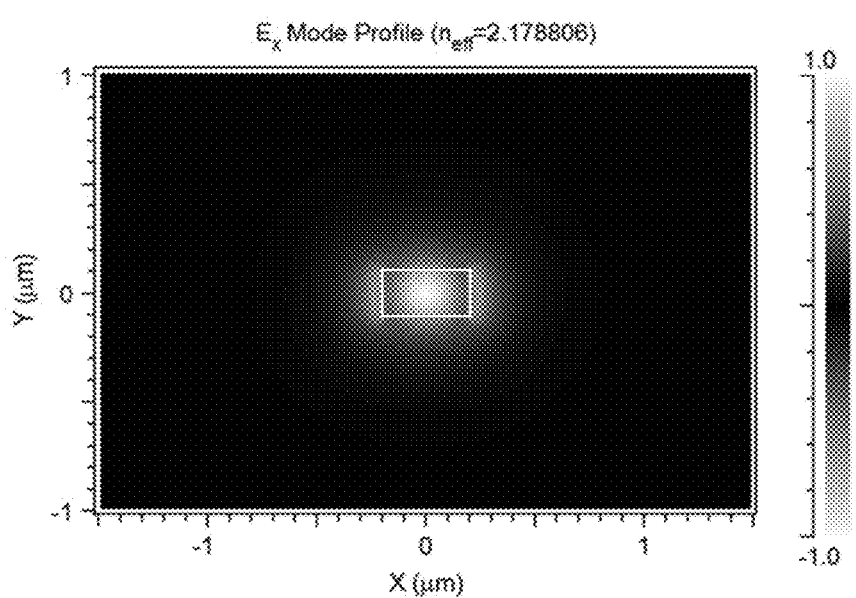
FIG. 10 is a graph obtained by calculating an $E_x$ component of an electric field distribution based on a $TE_0$ mode in a rectangular waveguide through a simulation.
Figure 11:
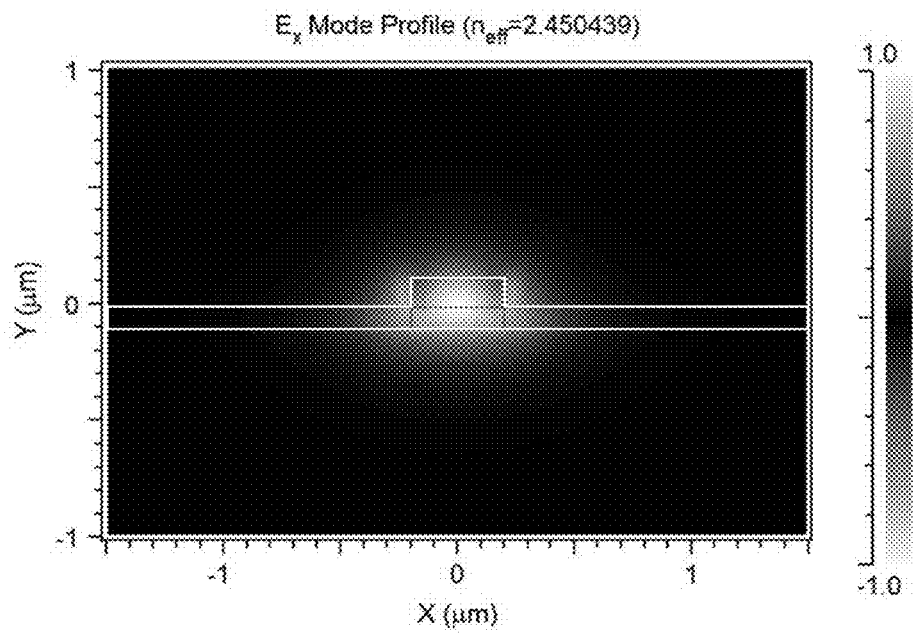
FIG. 11 is a graph obtained by calculating an $E_x$ component of an electric field distribution based on a $TE_0$ mode in a rib waveguide through a simulation.
Figure 12:
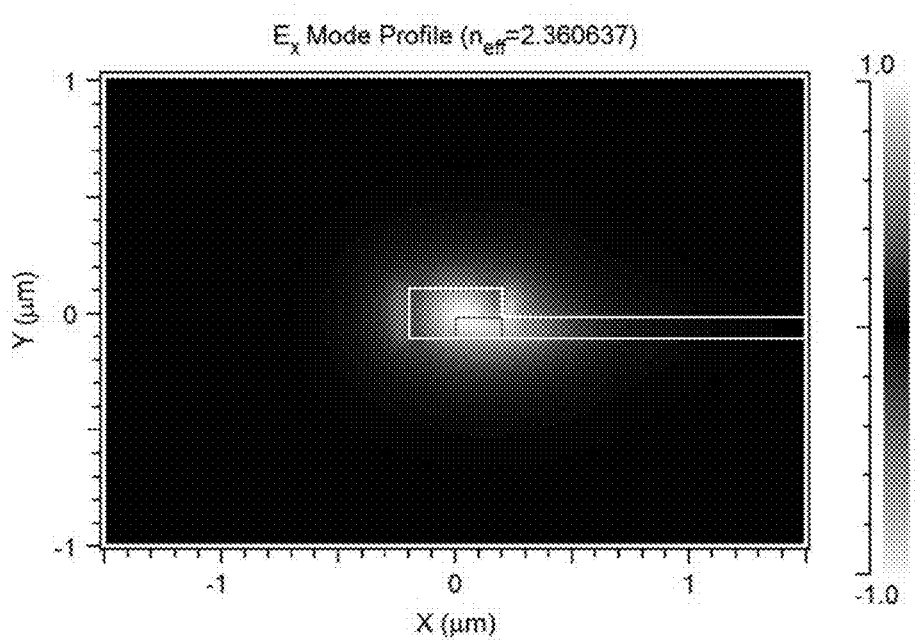
FIG. 12 is a graph obtained by calculating an $E_x$ component of an electric field distribution based on a $TE_0$ mode in a half-rib waveguide through a simulation.

Here, with respect to the rectangular waveguide, the rib waveguide, and the half-rib waveguide, graphs obtained by calculating an $E_x$ component of each $TE_0$ mode with respect to the rectangular waveguide, the rib waveguide, and the half-rib waveguide are shown in FIGS. 10 to 12. In this simulation, calculation was performed in a state where the thickness (height) of a rib portion (the thickness) (the thickness (height) of a core in the case of the rectangular waveguide, which is similarly applied hereinafter) is set to 220 nm, the thickness (height) of a slab portion (0 in the case of the rectangular waveguide, which is similarly applied hereinafter) is set to 95 nm, and the width of the rib portion (the width of the core in the case of the rectangular waveguide, which is similarly applied hereinafter) is set to 400 nm. Further, in FIGS. 10 to 12, contour lines of cross sections of cores that form the rectangular waveguide, the rib waveguide, and the half-rib waveguide are also shown.

If it is assumed that a contiguous waveguide is provided on the right side (+X direction) shown in FIGS. 10 to 12, an electric field also penetrates in a direction (−X direction) where a contiguous waveguide is not present, in the rib waveguide, as shown in the graph of in FIG. 11. Since light penetrating in the direction where the contiguous waveguide is not present does not contribute mode coupling, an entire coupling coefficient decreases.

On the other hand, in the half-rib waveguide, an electric field spreads up to the most rightward side compared with the other waveguides, as shown in the graphs of FIGS. 10 to 12. This is because in the case of the half-rib waveguide, a slab portion made of the same material as that of a rib portion is present on a contiguous waveguide side (+X direction), a refractive index difference between a core and a cladding effectively decreases on a slab portion side (+X direction) of the rib portion, and thus, light penetration increases. The light penetrating to the slab portion side (+X direction) of the rib portion significantly contributes to mode coupling to a contiguous waveguide. Accordingly, the half-rib waveguide has an extremely advantageous structure in a directional coupler.

More specifically, with respect to each of the rectangular waveguide, the rib waveguide, and the half-rib waveguide, the coupling coefficient $\chi$ was calculated. In calculation, the waveguide 1 that guided light of the $TE_0$ mode was set to be the same as in FIG. 10, and the width (the width of a rib portion) of the waveguide 2 that guided light of the $TE_1$ mode was determined for phase matching. Further, an interval (the width of a slab portion) between the respective waveguides was generally set to 300 nm, and the thicknesses (heights) of the rib portions were set to 220 nm, and the thickness (height) of the slab portion was set to 95 nm. Further, the calculation was performed at a wavelength of 1580 nm.

It is valid to fix the width (the width of the rib portion) of the waveguide 1 to be a uniform value for comparison, in view of the following points. That is, since as the width of the waveguide becomes narrower, penetration of light becomes larger, as the width (the width of the rib portion in the rib waveguide and the half-rib waveguide) of the waveguide 1 (and the waveguide 2 determined according to the waveguide 1) becomes narrower, coupling becomes stronger. However, in an actual manufacturing process, in a case where process variations are suppressed to be in a predetermined range, there is a limit in a minimum size of the width (the width of the rib portion) of the waveguide capable of being precisely manufactured. Thus, it is necessary to manufacture the waveguide to have a width of a predetermined value or greater. That is, the minimum size of the width (the width of the rib portion in the rib waveguide and the half-rib waveguide) of the waveguide even in different waveguide structures becomes uniform, which provides the validity. Since the width of the rectangular waveguide and the width of the rib portion are manufactured by the same etching process, there is almost no difference in difficulties in manufacturing.

Further, the interval between the waveguides was fixed to 300 nm for the same reason. That is, it is because as a contiguous waveguide becomes closer, mode coupling becomes stronger, but if the interval is set to a certain value or smaller in manufacturing, it is difficult to perform precise manufacturing.

In this view, it is valid to set the interval between the waveguides (the width of the slab portion) to be uniform. Since the interval of the rectangular waveguide and the width of the slab portion are also manufactured by the same etching process, there is almost no difference in difficulties in manufacturing.

Results obtained by determining the width of the waveguide 2 based on the above-described calculation conditions are shown in Table 2.

TABLE 2

|  |  | Waveguide 1 | Waveguide 2 |
|---|---|---|---|
| Rectangular waveguide | Width of waveguide (nm) | 400 | 836 |
|  | Effective refractive index | 2.178797245 ($TE_0$) | 2.175721407 ($TE_1$) |
| Rib waveguide | Width of rib portion (nm) | 400 | 959 |
|  | Effective refractive index | 2.450434208 ($TE_0$) | 2.450413227 ($TE_1$) |
| Half-rib waveguide | Width of rib portion (nm) | 400 | 908 |
|  | Effective refractive index | 2.360637188 ($TE_0$) | 2.360531569 ($TE_1$) |

Calculation results of coupling coefficients $\chi$ in this case are shown in Table 3.

TABLE 3

| Rectangular waveguide | 0.045732 rad/μm |
|---|---|
| Rib waveguide | 0.112311 rad/μm |
| Half-rib waveguide | 0.163356 rad/μm |

It can be understood from the calculation results that the half-rib waveguide shows the strongest mode coupling. This is because the strength of penetration of light to a contiguous waveguide is largest in the half-rib waveguide.

Figure 13A:
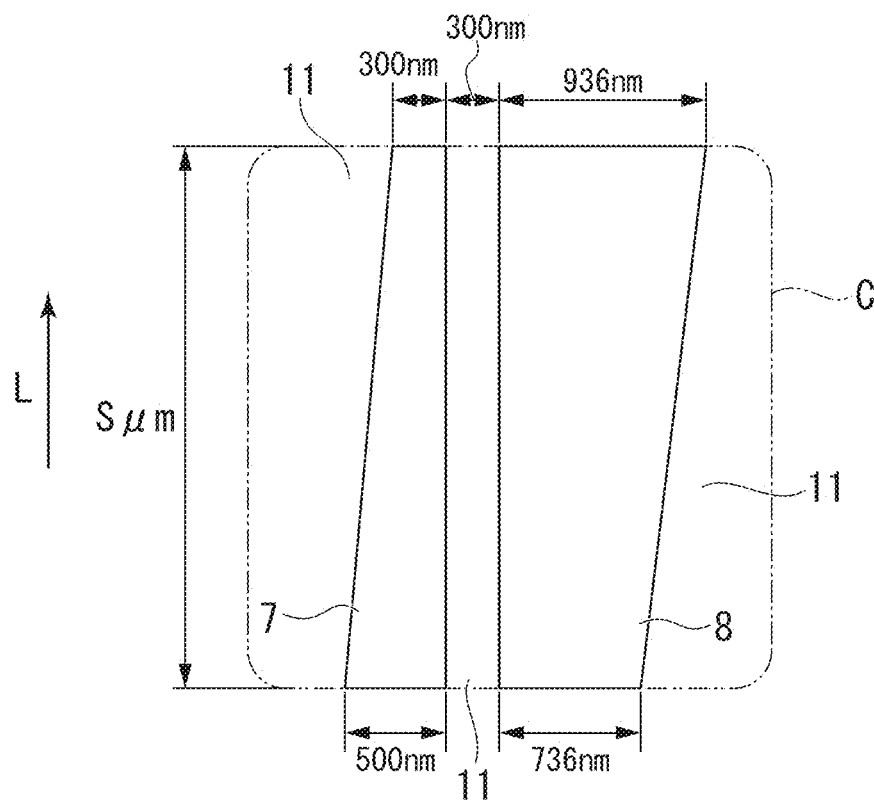
FIG. 13A is a plan view of a tapered directional coupler using a rectangular waveguide, which shows an example of the sizes of respective portions.
Figure 13B:
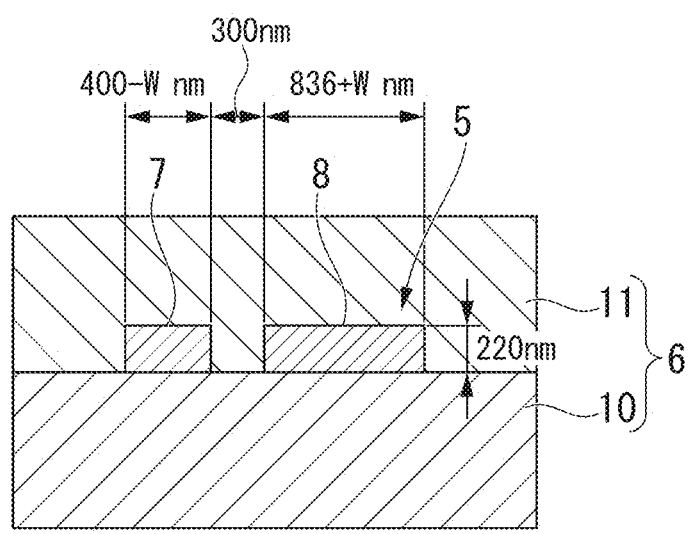
FIG. 13B is a sectional view of the tapered directional coupler using the rectangular waveguide, which shows an example of the sizes of respective portions.
Figure 14A:
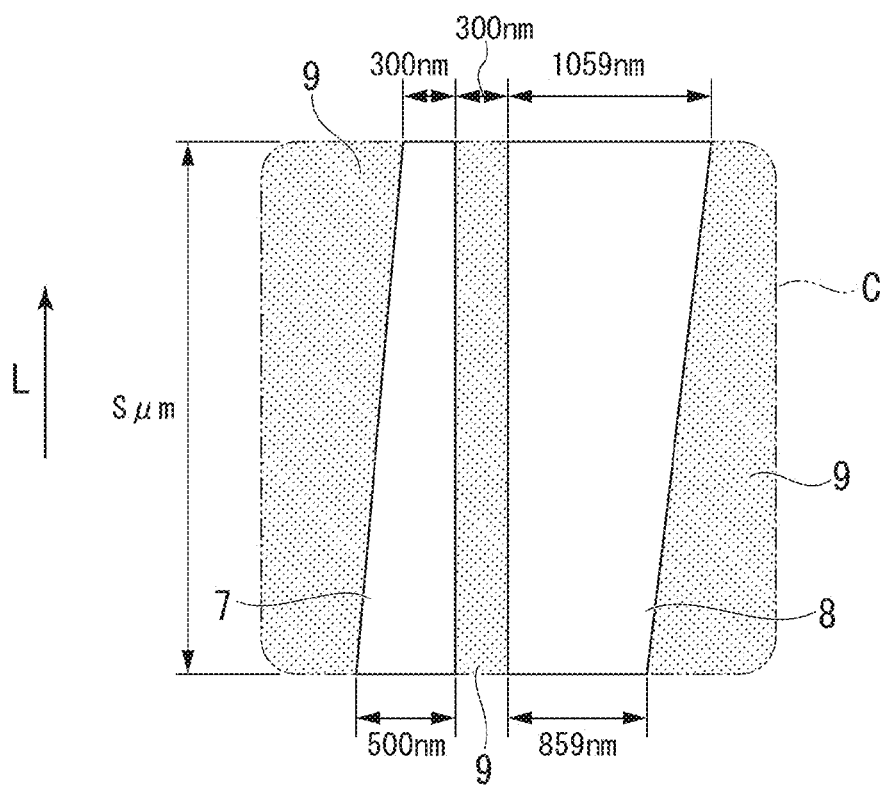
FIG. 14A is a plan view of a tapered directional coupler using a rib waveguide, which shows an example of the sizes of respective portions.
Figure 14B:
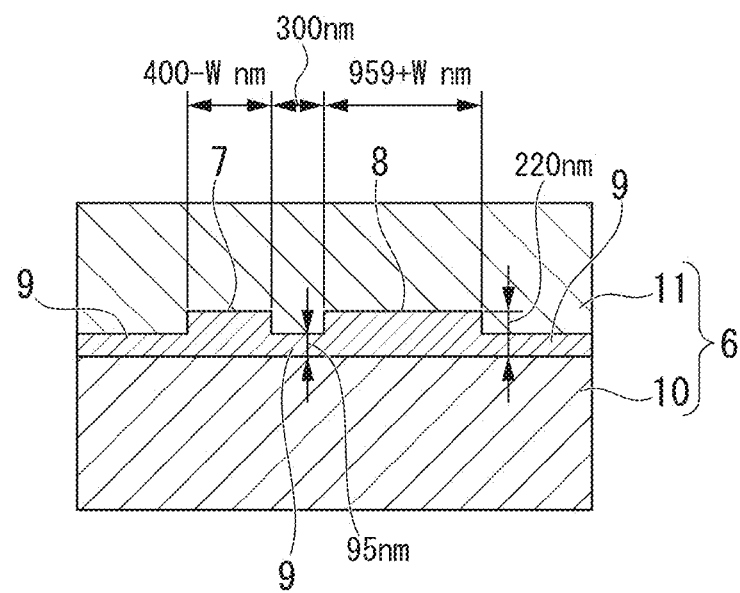
FIG. 14B is a sectional view of the tapered directional coupler using the rib waveguide, which shows an example of the sizes of respective portions.

Then, comparison between the tapered directional coupler using the half-rib waveguide shown in FIGS. 2A and 2B, a tapered directional coupler using a rectangular waveguide shown in FIGS. 13A and 13B, and a tapered directional coupler using a rib waveguide shown in FIGS. 14A and 14B is performed. FIG. 13A is a plan view showing an example of the sizes of respective portions of a tapered directional coupler using a rectangular waveguide. FIG. 13B is a cross-sectional view showing an example of the sizes of the respective portions of the tapered directional coupler using the rectangular waveguide. Further, FIG. 14A is a plan view showing an example of the sizes of respective portions of a tapered directional coupler using a rib waveguide. FIG. 14B is a cross-sectional view showing an example of the sizes of the respective portions of the tapered directional coupler using the rib waveguide. In the rectangular waveguide shown in FIGS. 13A and 13B and the rib waveguide shown in FIGS. 14A and 14B, the same reference numerals are given to the same portions as in the half-rib waveguide shown in FIGS. 2A and 2B.

W indicated in FIG. 13B and FIG. 14B is changed in a range of −100≤W≤100. Also, at a position of W=0, effective refractive indexes are determined to be the same at a wavelength of 1580 nm.

Figure 15:
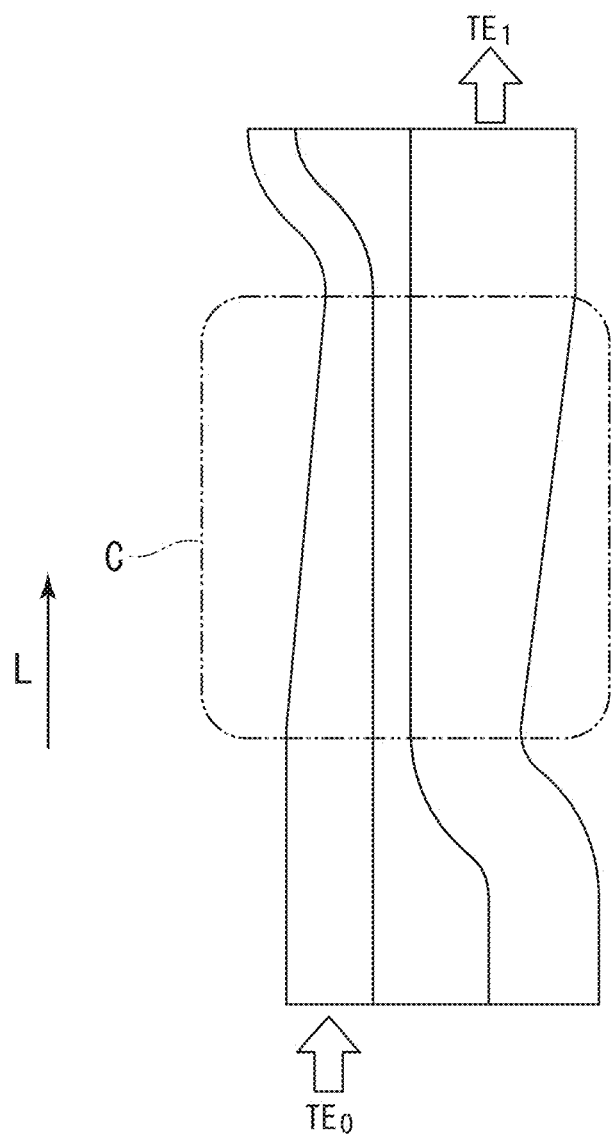
FIG. 15 is a plan view showing a waveguide structure outside an enclosure part C shown in FIGS. 2A, 13A, and 14A.

Further, in order to compare performances of the respective models, a waveguide structure shown in FIG. 15 was inspected. FIG. 15 is a plan view showing a waveguide structure outside an enclosure part C shown in FIG. 2A, FIG. 13A, and FIG. 14A. The waveguide shown in FIG. 15 includes a linear waveguide connected to an input side of the waveguide 1, a bending waveguide connected to an output side of the waveguide 2, a bending waveguide connected to an input side of the waveguide 2, and a linear waveguide connected to an output side of the waveguide 2, outside the enclosure part C shown in FIG. 2A, FIG. 13A, and FIG. 14A.

In FIG. 15, planar shapes of the bending waveguides and the linear waveguides that are outside the enclosure part C shown in FIG. 2A, FIG. 13A, and FIG. 14A are shown together. On the other hand, the bending waveguides and the linear waveguides shown in FIG. 15 form a half-rib waveguide outside the enclosure part C shown in FIG. 2A, form a rectangular waveguide outside the enclosure part C shown in FIG. 13A, and form a rib waveguide outside the enclosure part C shown in FIG. 14A. Further, the bending waveguide which is outside the enclosure part C shown in FIG. 15 is formed to be bent in an S shape by combination of two curves of a curvature of 40 μm and an angle of 8°.

Figure 16:
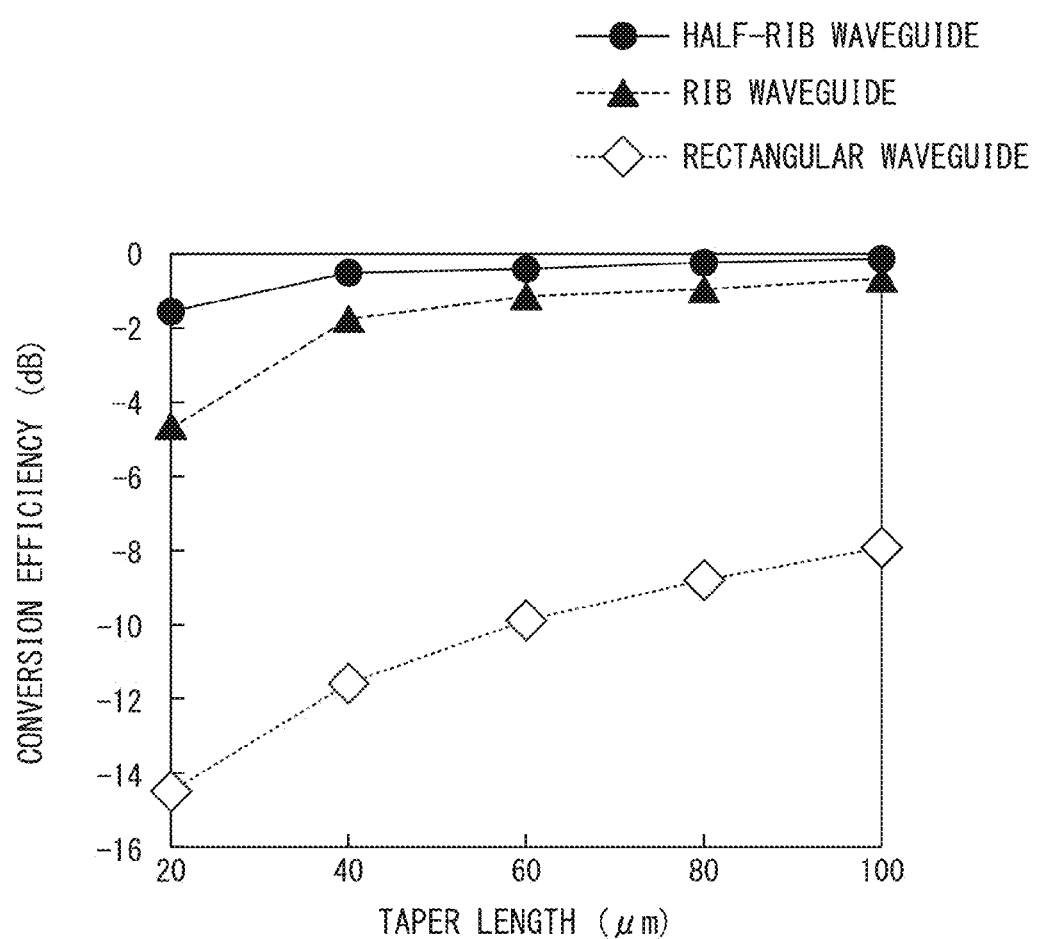
FIG. 16 is a graph showing relationships between taper lengths and conversion efficiencies with respect to a rectangular waveguide, a rib waveguide, and a half-rib waveguide.

In the above-described waveguide structure, a conversion efficiency [dB] of light of the $TE_1$ mode output from the output side of the waveguide 2 when light of the $TE_0$ mode is input from the input side of the waveguide 1 was calculated while changing each taper length S with respect to the rectangular waveguide, the rib waveguide, and the half-rib waveguide. The wavelength was set to 1520 nm, and a finite-difference time-domain (FDTD) method was used for the calculation. The calculation result is shown in FIG. 16. Here, the "conversion efficiency" refers to a ratio of power of light of the $TE_1$ mode on the output side to power of light of the $TE_0$ mode on the input side.

It can be understood from the graph shown in FIG. 16 that the conversion efficiency with respect to the taper length is highest in the half-rib waveguide and is lowest in the rectangular waveguide. On the other hand, the rib waveguide has a conversion efficiency is higher than that of the rectangular waveguide, but when the taper length is short, the conversion efficiency is lower than that of the half-rib wavelength. It can be understood that as the taper length becomes longer, the conversion efficiency becomes closer to that of the half-rib waveguide but is still lower than that of the half-rib waveguide. Accordingly, it can be understood that the taper length in a case where the conversion efficiencies are set to be the same becomes shortest in the half-rib waveguide, and thus, it is possible to reduce the device length. This is because the tapered directional coupler based on the half-rib waveguide shows the strongest coupling (coupling coefficient is large).

Figure 17:
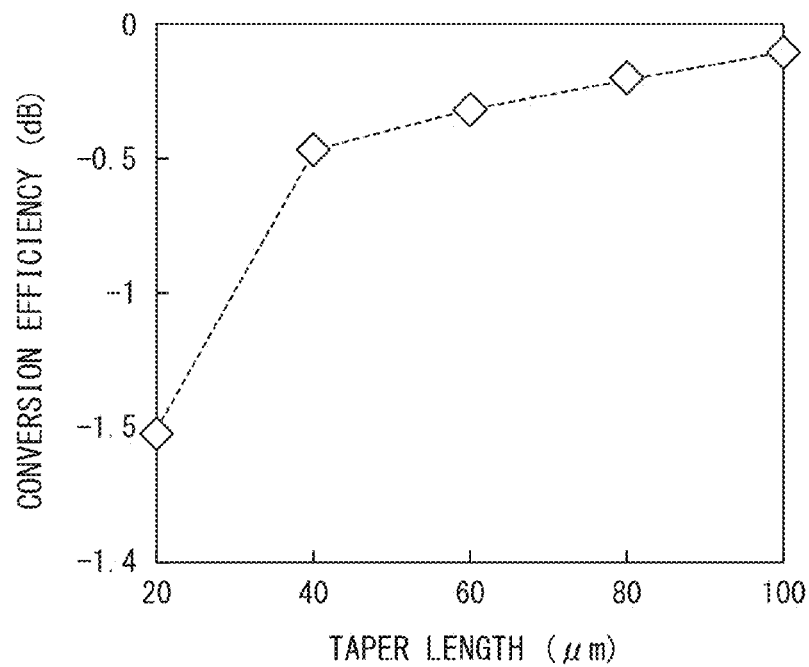
FIG. 17 is a graph showing a relationship between a taper length and a conversion efficiency with respect to a tapered directional coupler using a half-rib waveguide.

Then, a conversion efficiency of the half-rib waveguide was inspected from the calculation result shown in FIG. 16. Specifically, in the tapered directional coupler using the half-rib waveguide shown in FIGS. 2A and 2B, a conversion efficiency [dB] of light of the $TE_1$ mode output from the output side of the waveguide 2 when light of the $TE_0$ mode was input from the input side of the waveguide 1 was calculated while changing the taper length. Here, the wavelength was set to 1520 nm, and the FDTD method was used for simulation. The calculation result is shown in FIG. 17. In this simulation, the calculation was performed using the model shown in FIG. 15.

It can be understood from the calculation result shown in FIG. 17 that in the half-rib waveguide, as the taper length becomes longer, the conversion efficiency becomes higher. This is because if the taper length becomes longer, the width of the waveguide more gradually varies. It can be understood that the width of the waveguide becomes −0.10 dB when the taper length is 100 μm and a high conversion efficiency is obtained.

Figure 18:
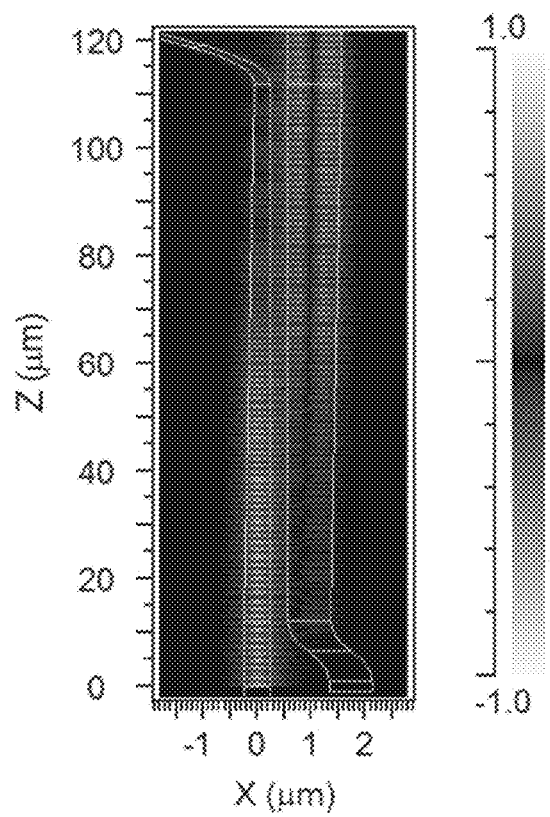
FIG. 18 is a graph showing an $E_x$ component at a cross section of y=0.1 μm of an electric field distribution when light of a $TE_0$ mode is input to a waveguide 1, with respect to a tapered directional coupler using a half-rib waveguide.

Further, an electric field distribution calculated using the FDTD method when the taper length is 100 μm is shown in FIG. 18.

In this simulation, the wavelength was set to 1520 nm. Further, the graph shown in FIG. 18 shows an $E_x$ component at a cross section of y=0.1 μm of the electric field distribution based on the $TE_0$ mode. In FIG. 18, a contour line of a plane of rib portions that form the waveguides 1 and 2 that form the half-rib waveguide is also shown.

It can be understood from the graph shown in FIG. 18 that light of the $TE_0$ mode is gradually mode-converted into light of the $TE_1$ mode around the center of the tapered directional coupler. The reason why the mode conversion is performed around the center of the tapered directional coupler is because phase matching is performed around the center and mode coupling is strongly performed.

Figure 19:
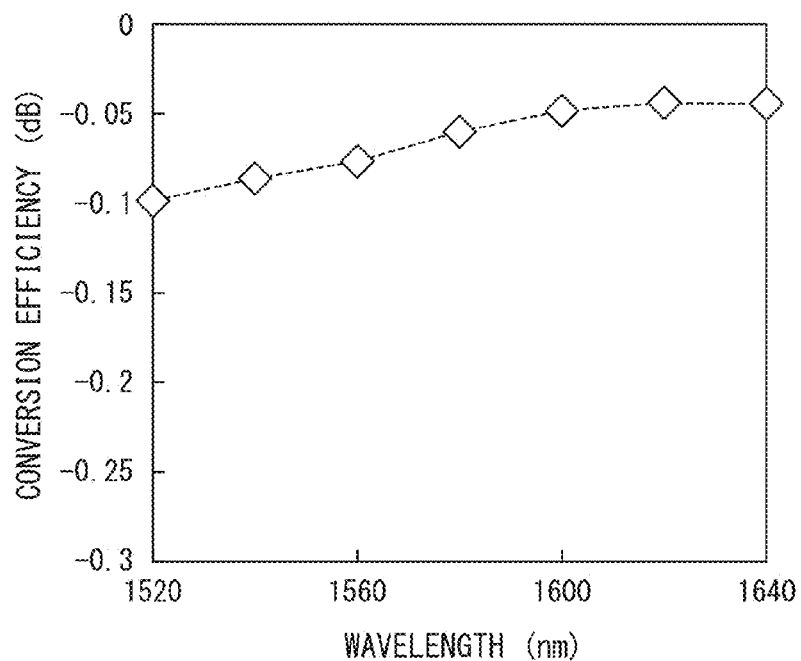
FIG. 19 is a graph showing a relationship between a wavelength and a conversion efficiency with respect to a tapered directional coupler using a half-rib waveguide.

Further, with respect to wavelength dependency, a conversion efficiency [dB] of light of the $TE_1$ mode output from the output side of the waveguide 2 when light of the $TE_0$ mode was input from the input side of the waveguide 1 was calculated using the FDTD method while changing the wavelength. The calculation result is shown in FIG. 19. In this simulation, the taper length was set to 100 μm.

It can be understood from the calculation result shown in FIG. 19 that a high conversion efficiency of −0.10 dB or higher is maintained over a range from 1520 nm to 1640 nm.

Further, in the tapered directional coupler using the half-rib waveguide, by inputting light of the $TE_0$ mode different from light of the $TE_1$ mode generated through mode conversion from the waveguide 1 to the waveguide 2 to the waveguide 2, it is possible to perform mode multiplexing in which the light of the $TE_1$ mode and the light of the $TE_0$ mode are simultaneously output from the waveguide 2.

Figure 20:
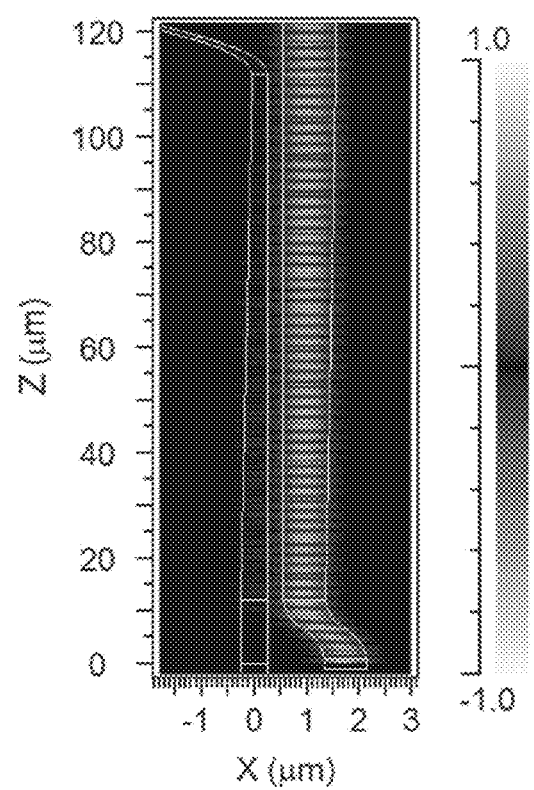
FIG. 20 is a graph showing an $E_x$ component at a cross section of y=0.1 μm of an electric field distribution when light of a $TE_0$ mode is input to a waveguide 2, with respect to a tapered directional coupler using a half-rib waveguide.

In order to confirm such a configuration, a transmittance of light of the $TE_0$ mode output from the output side of the waveguide 2 when light of the $TE_0$ mode was input from the input sides of the waveguide 1 and the waveguide 2 was calculated using the FDTD method. Here, the "transmittance" refers to the ratio of power of light of the $TE_1$ mode output from the waveguide 2 to power of light of the $TE_0$ mode input to the waveguide 2. Further, an electric field distribution calculated using the FDTD method when the taper length is 100 μm is shown in FIG. 20. In this modulation, the wavelength was set to 1520 nm. Further, the graph shown in FIG. 20 shows an $E_x$ component at a cross section of y=0.1 μm of the electric field distribution based on mode multiplexing.

In FIG. 20, a contour line of a plane of rib portions that form the waveguides 1 and 2 that form the half-rib waveguide is also shown.

In this case, the transmittance is −0.11 dB, and it can be understood that light is transmitted in the $TE_0$ mode with almost no loss. In this view, it can be understood that mode multiplexing is possible in a tapered directional coupler using a half-rib waveguide.

(Effects of the Invention)

Next, effects of the invention will be described.

[First Effect]

According to a first effect of the invention, in a case where a half-rib waveguide is used in a tapered directional coupler, it is possible to shorten a device length, and to achieve miniaturization. As described above, since the taper length when the conversion efficiency is set to be the same is shortest in the half-rib waveguide, it is possible to reduce the device length.

[Second Effect]

According to a second effect of the invention, it is possible to high efficient mode conversion in a wide wavelength band. This is based on the following two reasons.

The first reason is in that a tapered directional coupler is strong against variation due to a phase matching condition. A directional coupler is generally designed to perform phase matching at a certain wavelength by changing a waveguide structure such as the widths of waveguides. Thus, if a wavelength varies, variation may occur in effective refractive indexes of two modes having different electric field distributions, and thus, a conversion efficiency may be lowered. However, in the tapered directional coupler, it is sufficient if phase matching can be performed so that mode coupling is performed between an input edge and an output edge thereof in a light waveguide direction. Thus, even in a case where a phase matching range deviates from a design value due to change in a wavelength, as long as the phase matching range is included in the tapered directional coupler, mode conversion can be performed.

Figure 21:
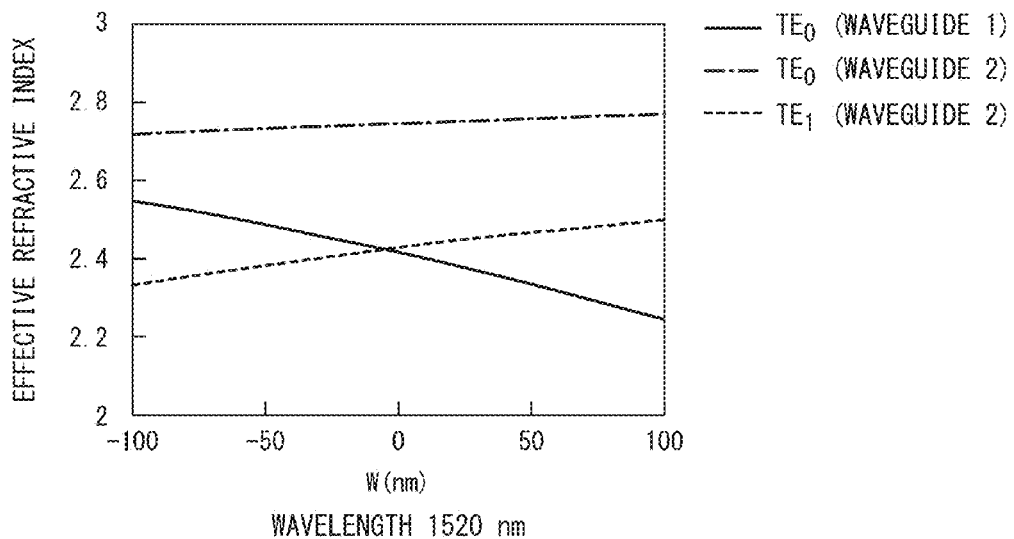
FIG. 21 is a graph of an effective refractive index corresponding to FIG. 3B at a wavelength of 1520 nm.
Figure 22:
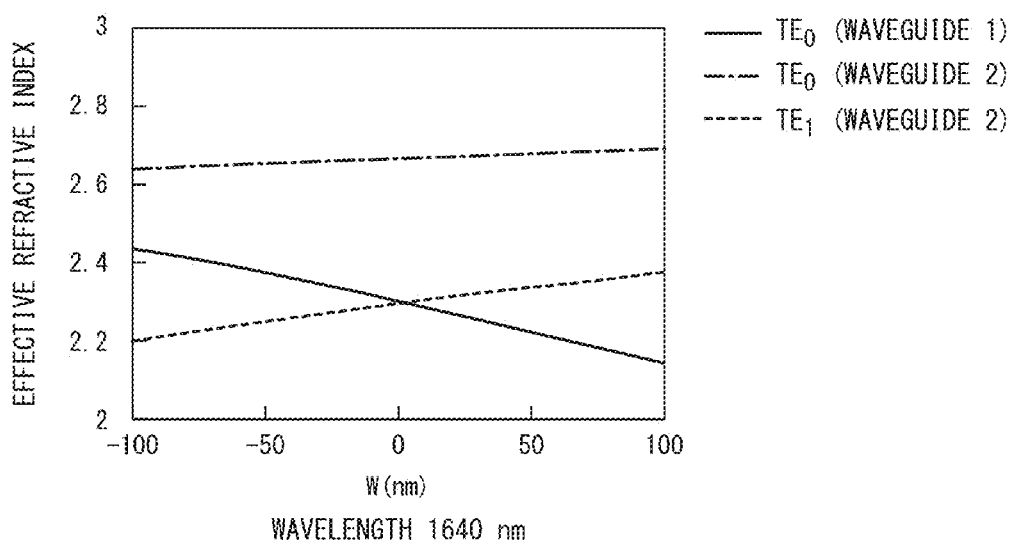
FIG. 22 is a graph of an effective refractive index corresponding to FIG. 3B at a wavelength of 1640 nm.

In order to confirm such a configuration, graphs of effective refractive indexes corresponding to the graph shown in FIG. 3B at a wavelength of 1520 nm and at a wavelength of 1640 nm are shown in FIG. 21 and FIG. 22, respectively. Simulation conditions are the same as in the case shown in FIGS. 2A and 2B. Only the wavelength is changed.

In the graph shown in FIG. 3B, it can be understood that a point where the effective refractive indexes are the same where W is 0 at a wavelength of 1580 nm (an intersection of effective refractive indexes of the $TE_0$ mode of the waveguide 1 and the $TE_1$ mode of the waveguide 2) is shifted between the graphs shown in FIGS. 21 and 22. However, it can be understood that since the intersection is included in the range of −100<W<100, mode conversion can be performed.

The second reason is in that a coupling coefficient χ becomes large by a half-rib waveguide. If a wavelength becomes short, since confinement of light to a waveguide (core) becomes larger, light penetrating to a contiguous waveguide is reduced, and thus, the coupling coefficient χ becomes small. If the coupling coefficient χ becomes small, a taper length necessary for obtaining a desired mode conversion efficiency becomes long. Accordingly, in a case where the taper lengths are the same, since the half-rib waveguide of the invention shows a coupling coefficient χ larger than those of the rectangular waveguide and the rib waveguide in the related art, it is possible to achieve mode conversion over a wide wavelength band.

[Third Effect]

According to a third effect of the invention, it is possible to maintain a strong and high conversion efficiency against manufacturing errors. For example the widths of waveguides (widths of rib portions) that are actually manufactured may deviate from a design value due to manufacturing errors. That is, even when effective refractive indexes of two modes that are coupling targets are designed to have the same values in a predetermined wavelength size, an actually manufactured waveguide may not have the same effective refractive indexes.

However, due to the same reasons as in the above-described second effect, in a tapered directional coupler, it is sufficient if phase matching can be performed so that mode coupling is performed between an input edge and an output edge in a light waveguide direction. Thus, even in a case where a phase matching range deviates from a design value due to change in a wavelength, as long as the phase matching range is included in the tapered directional coupler, mode conversion can be performed. Thus, this tapered directional coupler is strong against manufacturing errors. The manufacturing errors include an error of waveguide widths, and in addition, an error of waveguide heights (heights of rib portions) or a slab portion height, a case where the rib portions are inclinedly formed in a trapezoidal shape without being formed in a complete rectangular shape, a case where the shapes of the waveguides change, or the like.

Figure 23:
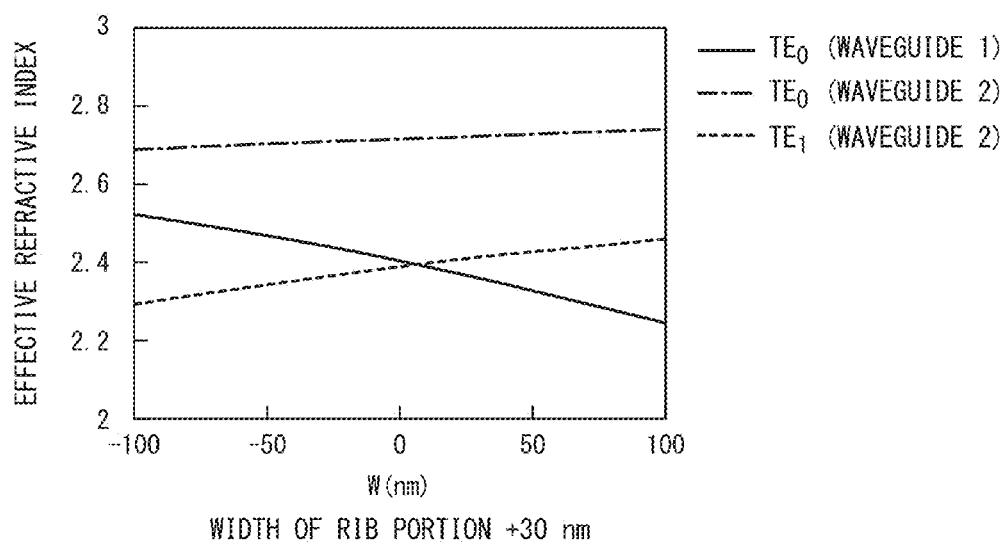
FIG. 23 is a graph of an effective refractive index corresponding to FIG. 3B when the width of a rib portion is changed by +30 nm.
Figure 24:
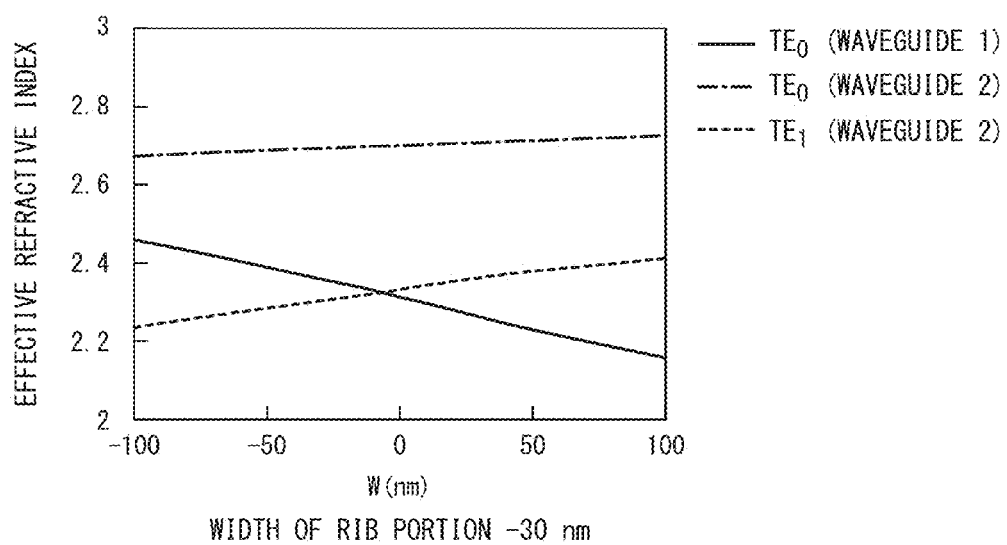
FIG. 24 is a graph of an effective refractive index corresponding to FIG. 3B when the width of a rib portion is changed by −30 nm.
Figure 25:
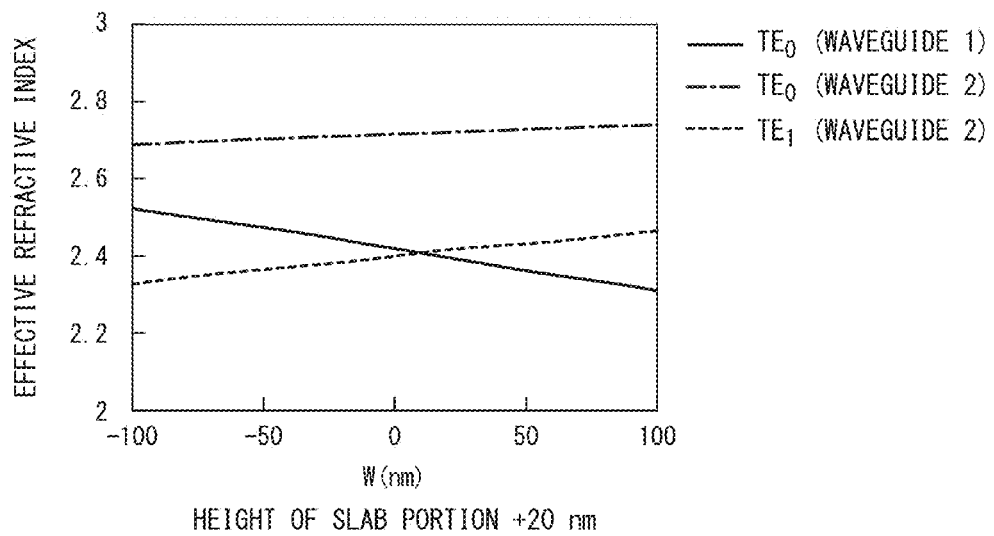
FIG. 25 is a graph of an effective refractive index corresponding to FIG. 3B when the height of a slab portion is changed by +20 nm.
Figure 26:
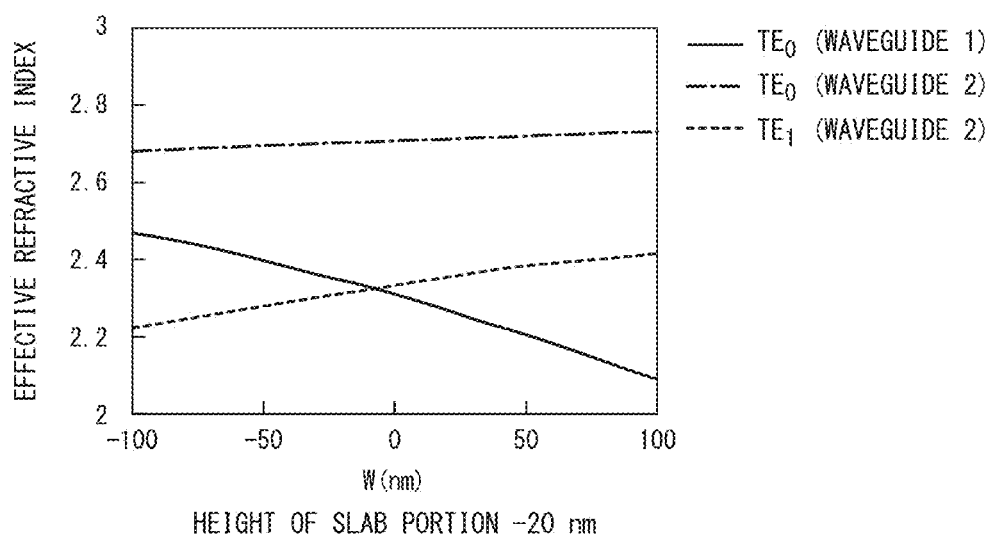
FIG. 26 is a graph of an effective refractive index corresponding to FIG. 3B when the height of a slab portion is changed by −20 nm.
Figure 27:
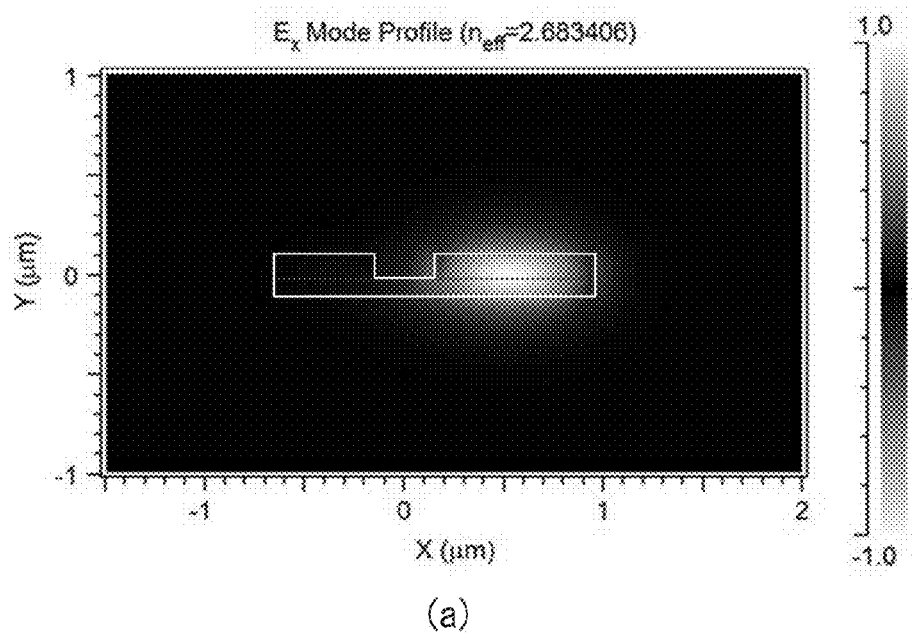
FIG. 27 is a graph obtained by calculating an Ex component of an electric field distribution based on #0 mode at a cross-sectional position (a) of W=−100 through a simulation.
Figure 28:
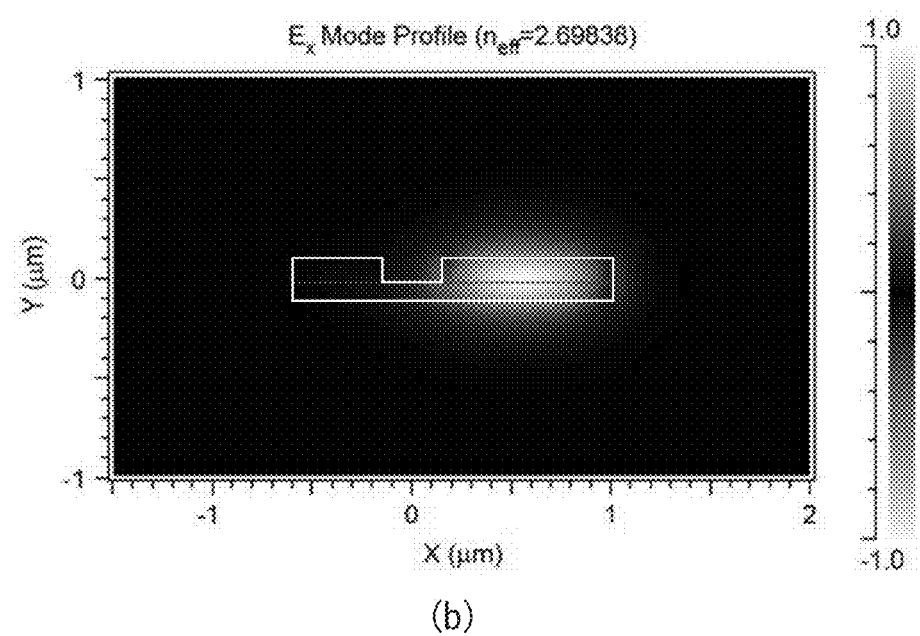
FIG. 28 is a graph obtained by calculating an Ex component of an electric field distribution based on #0 mode at a cross-sectional position (b) of W=−50 through a simulation.
Figure 29:
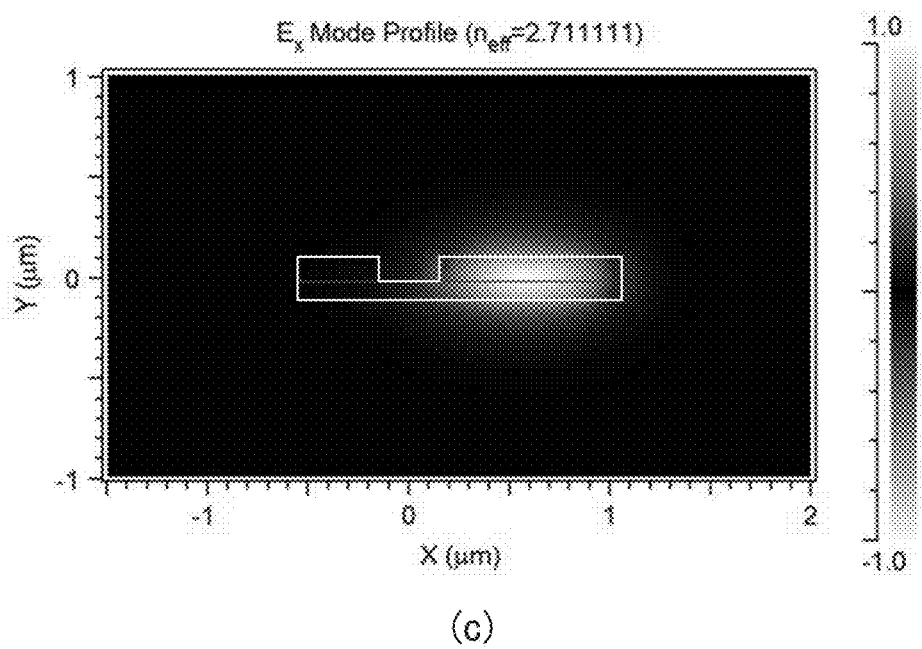
FIG. 29 is a graph obtained by calculating an Ex component of an electric field distribution based on #0 mode at a cross-sectional position (c) of W=0 through a simulation.
Figure 30:
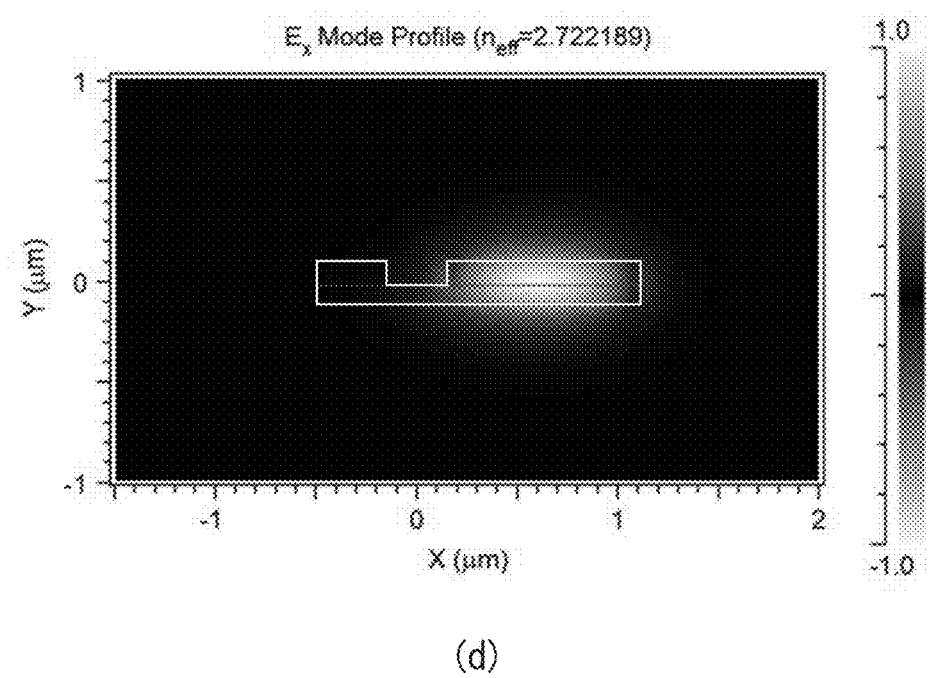
FIG. 30 is a graph obtained by calculating an Ex component of an electric field distribution based on #0 mode at a cross-sectional position (d) of W=+50 through a simulation.
Figure 31:
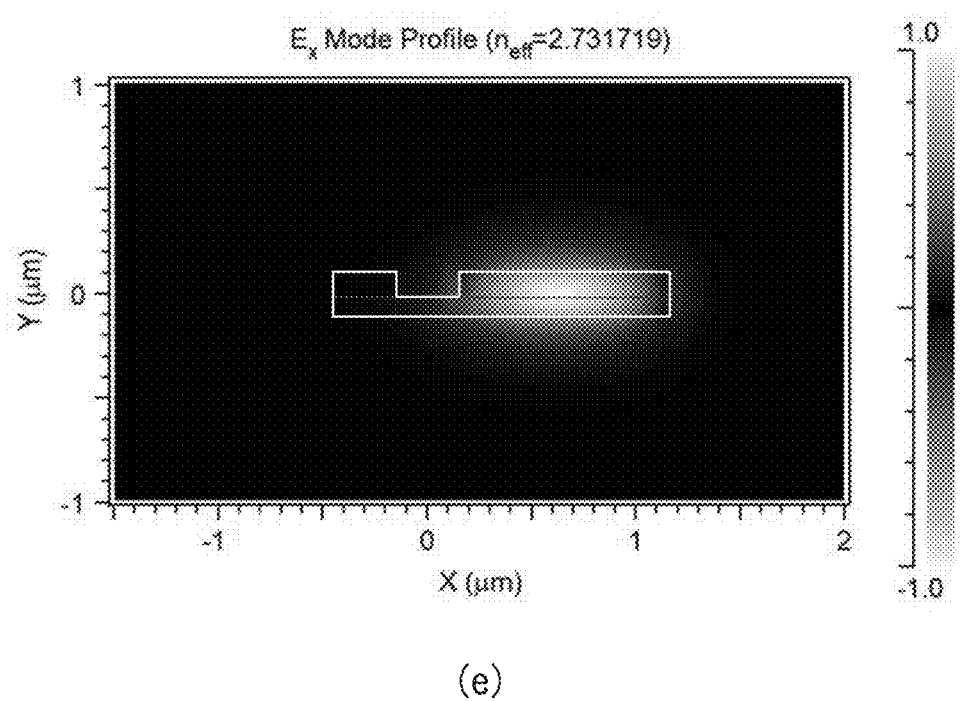
FIG. 31 is a graph obtained by calculating an Ex component of an electric field distribution based on #0 mode at a cross-sectional position (e) of W=+100 through a simulation.

In order to confirm such a configuration, graphs of effective refractive indexes corresponding to the graph shown in FIG. 3B when the widths of the rib portions are changed by +30 nm and when the widths of the rib portions are changed by −30 nm are shown in FIG. 23 and FIG. 24, respectively. Further, graphs of effective refractive indexes corresponding to the graph shown in FIG. 3B when the height of the slab portion is changed by +20 nm and when the height of the slab portion is changed by −20 nm are shown in FIG. 25 and FIG. 26, respectively. Simulation conditions are the same as the cases shown in FIGS. 2A and 2B. The wavelength was set to 1580 nm.

In the graph shown in FIG. 3B, it can be understood that a point where the effective refractive indexes are the same where W is 0 (an intersection of effective refractive indexes of the $TE_0$ mode of the waveguide 1 and the $TE_1$ mode of the waveguide 2) is shifted between the graphs shown in FIGS. 23 to 26. However, it can be understood that since the intersection is included in the range of −100<W<100, mode conversion can be performed.

Further, the half-rib waveguide of the invention shows a large coupling coefficient $\chi$ compared with those of the rectangular waveguide and the rib waveguide in the related art. Thus, in a case where a manufacturing error such that penetration of light to a contiguous waveguide is reduced occurs, for example, even in a case where the widths of the rib portions become large and confinement of light becomes strong, in a case where the height of the slab portion decreases so that penetration is reduced, or in similar cases, it is possible to maintain a high coupling efficiency for the same reasons as in the second effect. Accordingly, the half-rib waveguide of the invention has a stronger structure against manufacturing errors compared with those of the rectangular waveguide and the rib waveguide in the related art.

[Fourth Effect]

According to a fourth effect of the invention, it is possible to perform mode multiplexing. That is, light of the $TE_0$ mode that does not contribute to mode conversion, input to the input side of the waveguide 2, is not mode-converted by the tapered directional coupler and is output from the output edge of the waveguide 2 as it is without moving to the waveguide 1. Thus, it is possible to output the light of the $TE_1$ mode generated by the mode conversion from the waveguide 1 to the waveguide 2 and the light of the $TE_0$ mode input to the waveguide 2 from the waveguide 2 at the same time.

Here, using the tapered directional coupler using the half-rib waveguide shown in FIGS. 2A and 2B as an example, a configuration in which it is possible to perform mode multiplexing for simultaneously outputting light of a mode A and light of a mode B from the waveguide 2 by causing light of the $TE_0$ mode (mode B) different from the $TE_1$ mode (mode A) generated by the mode conversion from the waveguide 1 to the waveguide 2 to be input to the waveguide 2 will be described.

As understood from the graph shown in FIG. 3B, the effective refractive index curve of the $TE_0$ mode of the waveguide 2 does not intersect an effective refractive index curve of any mode of the waveguide 1. Thus, mode coupling becomes extremely weak, and the light of the $TE_0$ mode input to the waveguide 2 is not almost mode-converted into any mode of the waveguide 1.

Further, graphs obtained by calculating an $E_x$ component of an electric field distribution based on a #0 mode (corresponding to the $TE_0$ mode) of the waveguide 2 through simulation for each of cross-sectional positions (a) to (e) with respect to W, corresponding to the graphs shown in FIGS. 5 to 9, are shown in FIGS. 27 to 31. It can be understood from the graphs shown in FIGS. 27 to 31 that light of the $TE_0$ mode of the waveguide 2 is not mode-coupled with the mode of the waveguide 1.

As described above, the light of the $TE_0$ mode of the waveguide 2 is output as it is from the waveguide 2 without being mode-converted. Thus, it is possible to perform mode multiplexing between the light of the $TE_0$ mode and the light of the $TE_1$ mode output from the waveguide 2 that is mode-converted from the waveguide 1.

[Fifth Effect]

According to a fifth effect of the invention, it is possible to perform mode conversion between other modes, without being limited to the above-described mode conversion from the $TE_0$ mode to the $TE_1$ mode. That is, by performing tapering so that desired effective refractive indexes of modes of two contiguous waveguides intersect each other, it is possible to achieve the same effect. Here, since the half-rib waveguides is used, it is possible to obtain a coupling coefficient $\chi$ larger than that of the rectangular waveguide or the rib waveguide in the related art, and to decrease the device length.

The invention has a large effect with respect to conversion relating to a TE polarization. This is based on the following reasons. In the TE polarization, generally, the degree of confinement (electric field distribution or effective refractive index) significantly changes with respect to a change of a waveguide structure in a width direction. Thus, penetration of light to a slab portion of a half-rib waveguide is larger in the TE polarization than in TM polarization. Accordingly, an effect of increase in a coupling coefficient $\chi$ when the half-rib waveguide is employed is also larger in the case of the TE polarization.

[سixth Effect]

According to a sixth effect of the invention, it is possible to achieve a structure in which integration of an optical modulator that includes a rib type phase modulating section or an optical waveguide element having other rib waveguides is easily performed. That is, according to the invention, by changing the widths of rib portions without changing the heights of the rib portions and a slab portion, it is possible to manufacture a tapered directional coupler. Thus, it is possible to design a slab portion and rib portions in rib waveguides of a rib type phase modulating section having the same heights. Further, since the same etching process as in the rib type phase modulating section may be applied, it is possible to perform batch manufacturing. Furthermore, it is possible to easily perform integration with an optical waveguide element having different waveguides.

[Seventh Effect]

According to a seventh effect of the invention, in the case of the half-rib waveguide, since a slab portion is present on one side of a rib portion in a width direction, the area of a sidewall portion on the side of the rib portion where the slab portion is provided becomes smaller. Thus, the influence due to roughness of a sidewall of a waveguide generated by manufacturing errors (increase in loss due to light scattering) is reduced, compared with that of the rectangular waveguide formed only by the rib portion in the related art.

First Embodiment

<Planar Optical Waveguide Device>

Figure 32A:
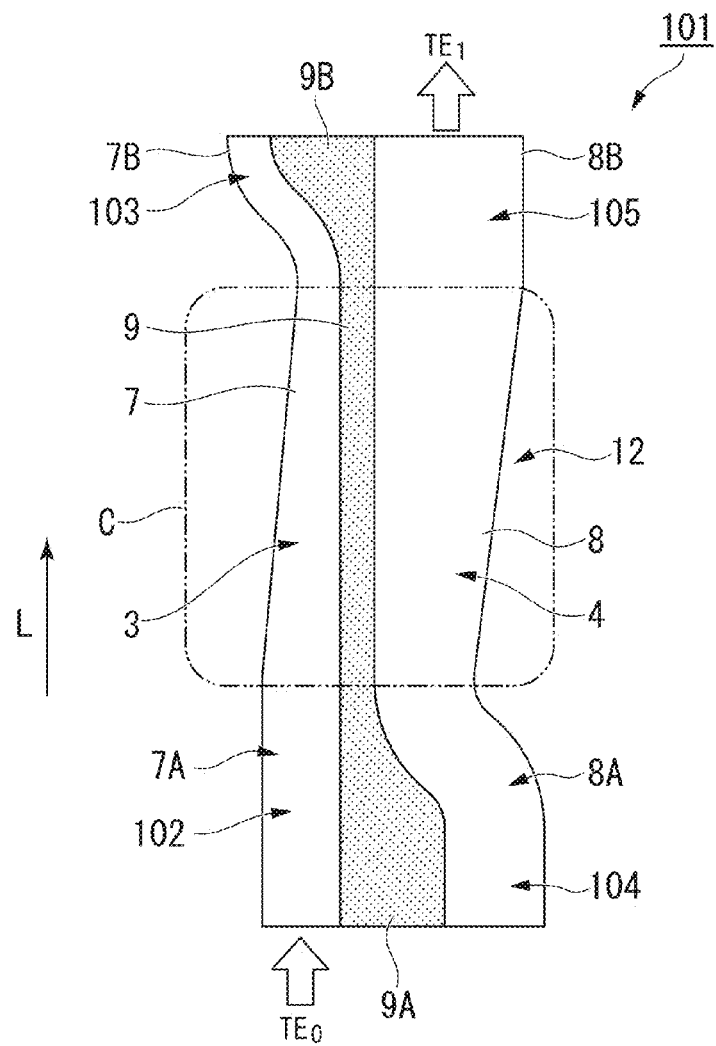
FIG. 32A is a plan view showing a planar optical waveguide device according to a first embodiment of the invention.
Figure 32B:
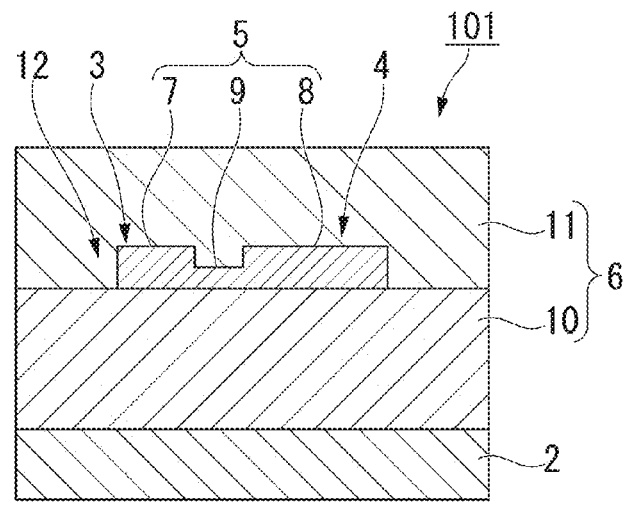
FIG. 32B is a sectional view of the planar optical waveguide device according to the first embodiment of the invention.

Next, a planar optical waveguide device 101 shown in FIGS. 32A and 32B will be described as a first embodiment of the invention. FIG. 32A is a plan view showing the planar optical waveguide device 101, and FIG. 32B is a cross-sectional view of the planar optical waveguide device 101 in an enclosure part C indicated by a broken line in FIG. 32A. Further, in the following description, a description of the same portions as in the planar optical waveguide device 1 shown in FIGS. 1A and 1B will not be repeated, and are given the same reference numerals in the drawings.

The planar optical waveguide device 101 shown in FIGS. 32A and 32B has a configuration corresponding to the planar optical waveguide device 1 in the enclosure part C. Further, the planar optical waveguide device 101 includes a first linear waveguide 102 connected to an input side of a first waveguide 3, a first bending waveguide 103 connected to an output side of the first waveguide 3, a second bending waveguide 104 connected to an input side of a second waveguide 4, and a second linear waveguide 105 connected to an output side of the second waveguide 4, on an outer side of the enclosure part C. Except for this configuration, the planar optical waveguide device 101 has basically the same configuration as that of the planar optical waveguide device 1.

A core 5 includes a first rib portion 7A, a second rib portion 8A, a slab portion 9A, a first rib portion 7B, a second rib portion 8B, and a slab portion 9B. The first rib portion 7A forms the first linear waveguide 102. The second rib portion 8A forms the second bending waveguide 104. The slab portion 9A is shared between the first rib portion 7A and the second portion 8A. The thickness (height) of the slab portion 9A is smaller than the thickness of the first rib portion 7A and the thickness of the second rib portion 8A. Further, the first rib portion 7B forms the first bending waveguide 103. The second rib portion 8B forms the second linear waveguide 105. The slab portion 9B is shared between the first rib portion 7B and the second rib portion 8B. The thickness (height) of the slab portion 9B is smaller than the thickness of the first rib portion 7B and the thickness of the second rib portion 8B.

The first linear waveguide 102 and the second linear waveguide 105 are formed in a linear shape by the first rib portion 7A and the second rib portion 8B so that the widths and thicknesses (heights) are uniform in a length direction. The first rib portion 7A and the second rib portion 8B are continuously formed on one end side (input side) of the first rib portion 7 and the other end side (output side) of the second rib portion 8, respectively. That is, the first rib portion 7A is formed to have a cross section of a rectangular shape and the same width and thickness (height) as those of the one end side (input side) of the first rib portion 7. On the other hand, the second rib portion 8B is formed to have a cross section of a rectangular shape and the same width and thickness (height) as those of the other end side (output side) of the second rib portion 8.

The first bending waveguide 103 and the second bending waveguide 104 are formed to be bent in a plane by the first rib portion 7B and the second rib portion 8A so that the widths and thicknesses (heights) are uniform in a length direction. The first rib portion 7B and the second rib portion 8A are continuously formed on the other end side (output side) of the first rib portion 7 and one end side (input side) of the second rib portion 8, respectively.

That is, the first rib portion 7B is formed to have a cross section of a rectangular shape and the same width and thickness (height) as those of the other end side (output side) of the first rib portion 7. On the other hand, the second rib portion 8A is formed to have a cross section of a rectangular shape and the same width and thickness (height) as those of one end side (input side) of the second rib portion 8.

The first bending waveguide 103 is formed to be bent in an S shape at predetermined curvature and angle so that an interval between the first rib portion 7A and the second rib portion 8A continuously decreases along a light waveguide direction L. On the other hand, the second bending waveguide 104 is formed to be bent in an S shape at predetermined curvature and angle so that an interval between the first rib portion 7B and the second rib portion 8B continuously decreases along a light waveguide direction L. In the case of the sizes shown in FIGS. 2A and 2B, the first bending waveguide 103 and the second bending waveguide 104 are formed to be bent in an S shape by combination of two curves of a curvature of 40 μm and an angle of 8°.

The slab portion 9A is formed to be connected to the slab portion 9 and to have the same thickness (height) as that of the slab portion 9. The slab portion 9A is formed between side surfaces of the first rib portion 7A and the second rib portion 8A that face each other. Thus, the first linear waveguide 102 and the second bending portion 104 form a half-rib waveguide where the slab portion 9A is provided on only one side of the first rib portion 7A and the second rib portion 8A in the width direction.

The slab portion 9B is formed to be connected to the slab portion 9 and to have the same thickness (height) as that of the slab portion 9. The slab portion 9B is formed between side surfaces of the first rib portion 7B and the second rib portion 8B that face each other. Thus, the first bending waveguide 103 and the second linear portion 105 form a half-rib waveguide where the slab portion 9B is provided on only one side of the first rib portion 7B and the second rib portion 8B in the width direction.

In the planar optical waveguide device 101, by processing an Si layer which is an uppermost layer of the above-mentioned SOI wafer, it is possible to form the first linear waveguide 102, the first bending waveguide 103, the second bending waveguide 104, and the second linear waveguide 105 (the first rib portions 7A and 7B, the second rib portions 8A and 8B, and the slab portions 9A and 9B).

In the planar optical waveguide device 101 of this embodiment, light that is guided in a $TE_0$ mode (indicated by an arrow $TE_0$ in FIG. 32A) is input to the first linear waveguide 102, and is mode-coupled by a mode converting section 12. Further, light (indicated by an arrow $TE_1$ in FIG. 32A) that is guided in a $TE_1$ mode is mode-converted from the $TE_0$ mode, and is output from the second linear waveguide 105.

In the planar optical waveguide device 101 of this embodiment, by forming the first linear waveguide 102 to which the light that is guided in the $TE_0$ mode is input and the second linear waveguide 105 from which the light that is guided in the $TE_1$ mode is output as linear waveguides, respectively, it is possible to prevent an increase in loss due to bending.

Further, in the planar optical waveguide device 101 of this embodiment, the second bending waveguide 104 gradually becomes close to the contiguous first linear waveguide 102, and the first bending waveguide 103 gradually becomes distant from the second contiguous linear waveguide 105. Thus, reflection is reduced. Further, in addition to the above-described method in which phase-matching is not performed by waveguide tapering, by using a method for making the contiguous waveguide distant on an input side and an output side, it is possible to reduce penetration of light to the contiguous waveguide, and thus, it is possible to weaken mode coupling, to thereby significantly break a phase matching condition. If the phase matching condition is significantly broken, since a mode electric field distribution is locally present in one waveguide, it is possible to achieve clear mode conversion, and to achieve conversion with high efficiency.

Second Embodiment

<Planar Optical Waveguide Device>

Figure 33A:
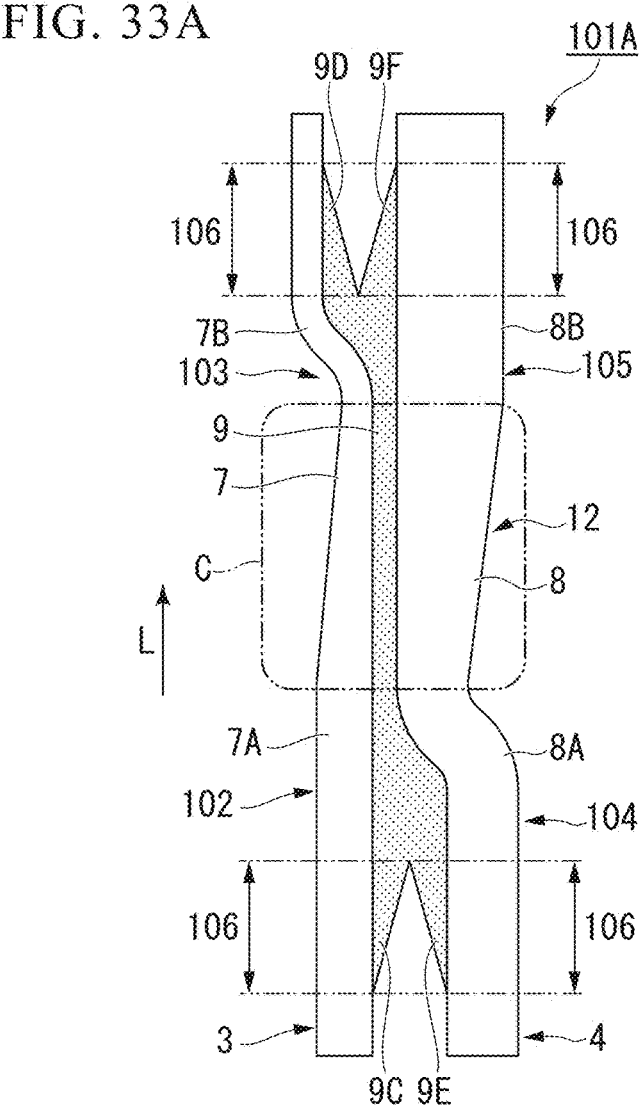
FIG. 33A is a plan view showing a planar optical waveguide device according to a second embodiment of the invention.
Figure 33B:
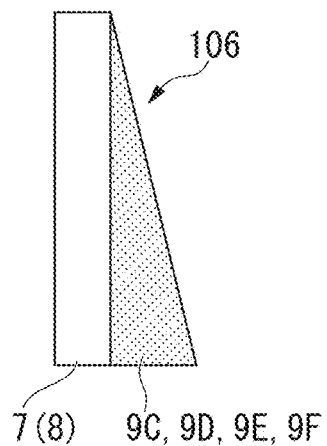
FIG. 33B is a plan view of a taper waveguide of the planar optical waveguide device according to the second embodiment of the invention.
Figure 33C:
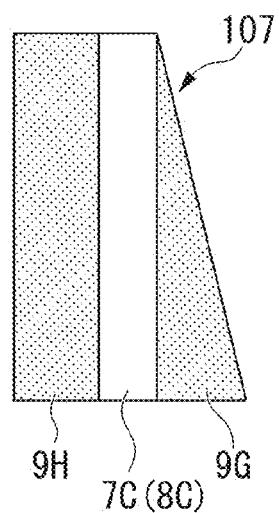
FIG. 33C is a plan view showing a modification example of the taper waveguide of the planar optical waveguide device according to the second embodiment of the invention.

Next, a planar optical waveguide device 101A shown in FIGS. 33A, 33B, and 33C will be described as a second embodiment. FIG. 33A is a plan view showing the planar optical waveguide device 101A. FIG. 33B is a plan view showing a tapered waveguide 106 provided in the planar optical waveguide device 101A. FIG. 33C is a plan view showing a modification example of a taper waveguide 107.

The planar optical waveguide device 101A of this embodiment shown in FIG. 33A has substantially the same configuration as that of the planar optical waveguide device 101, except that shapes of slab portions 9C to 9F are different outside the enclosure part C.

The planar optical waveguide device 101A of this embodiment has a configuration in which the tapered waveguide 106 as shown in FIG. 33B is connected to a first linear waveguide 102, a first bending waveguide 103, a second bending waveguide 104, and a second linear waveguide 105.

In the tapered waveguide 106, as shown in FIGS. 33A and 33B, a waveguide structure continuously changes along the light waveguide direction L between a half-rib waveguide and a rectangular waveguide. Specifically, the tapered waveguide 106 includes first slab portions 9C and 9D, and second slab portions 9E and 9F. The first slab portions 9C and 9D are continuously provided on side surfaces of first rib portions 7A and 7B that face second rib portions 8A and 8B, respectively. The second slab portions 9E and 9F are continuously provided on side surfaces of second rib portions 8A and 8B that face first second rib portions 7A and 7B, respectively. The first slab portions 9C and 9D and the second slab portions 9E and 9F are provided to be connected to the slab portion 9, and have widths that continuously increase toward the slab portion 9.

The first slab portion 9C and the second slab portion 9E on an input side are provided to extend to the slab portion 9 with widths that gradually increase at a predetermined taper angle from a middle portion between the first rib portion 7A and the second rib portion 8A. Thus, the first linear waveguide 102 and the second bending waveguide 104 form a waveguide structure in which the rectangular waveguide is converted into the half-rib waveguide.

On the other hand, the first slab portion 9D and the second slab portion 9F on an output side are provided to extend to the slab portion 9 with widths that gradually increase at a predetermined taper angle from a middle portion between the first rib portion 7B and the second rib portion 8B. Thus, the second bending waveguide 104 and the second linear waveguide 105 form a waveguide structure in which the rectangular waveguide is converted into the half-rib waveguide.

In the planar optical waveguide device 101A of this embodiment, by using such a tapered waveguide 106, it is possible to continuously change the widths of the slab portions 9C, 9D, 9E, and 9F between the rectangular waveguide and the half-rib waveguide. Thus, connection of the rectangular waveguide with the half-rib waveguide becomes easy.

On the other hand, in a case where a tapered waveguide 107 as shown in FIG. 33C is used, a waveguide structure in which a rib waveguide is converted into a half-rib waveguide, or a waveguide structure in which a half-rib waveguide is converted into a rib waveguide are obtained.

Specifically, the tapered waveguide 107 includes slab portions 9G and 9H which are continuously provided on both sides of a first rib portion 7C and/or a second rib portion 8C in a width direction. Here, one slab portion 9G is provided to extend from one end of the rib portion 9C to the other end of the rib portion 9 with a width that gradually increases at a predetermined taper angle. The other slab portion 9G is provided to extend with a predetermined width between one end and the other end of the rib portion 9C. The tapered waveguide 107 may have a configuration in which the width of the slab portion 9G changes and the width of the rib portion 9C also changes.

In a case where such a tapered waveguide 107 is used, it is possible to continuously change the widths 9G and 9H of the slab portions between the rib waveguide and the half-rib waveguide. Thus, connection of the rib waveguide with the half-rib waveguide becomes easy.

Third Embodiment

<Planar Optical Waveguide Device>

Figure 34A:
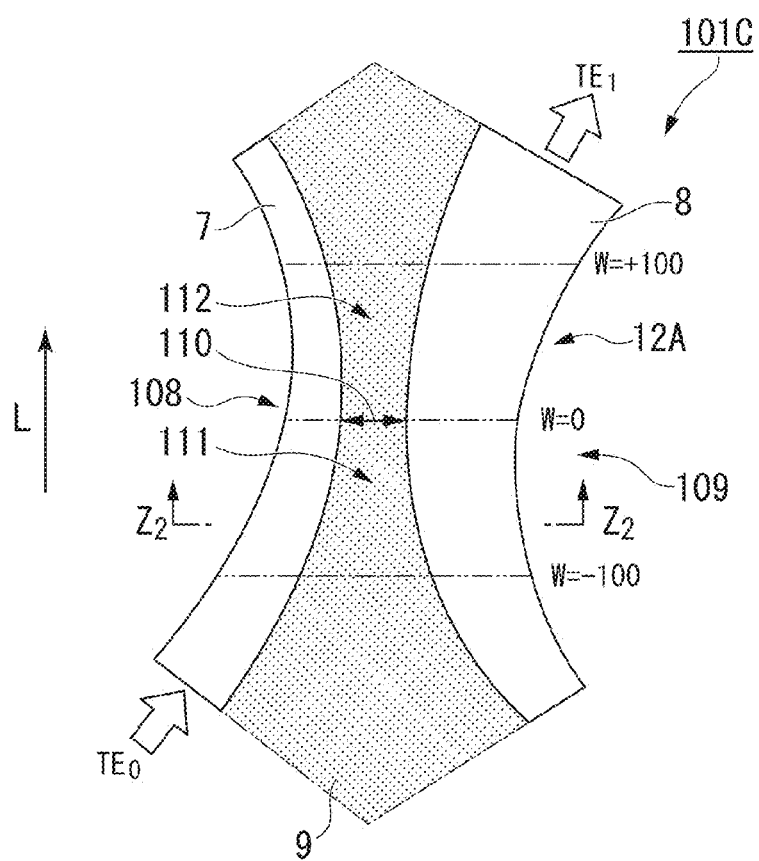
FIG. 34A is a plan view of a planar optical waveguide device according to a third embodiment of the invention.
Figure 34B:
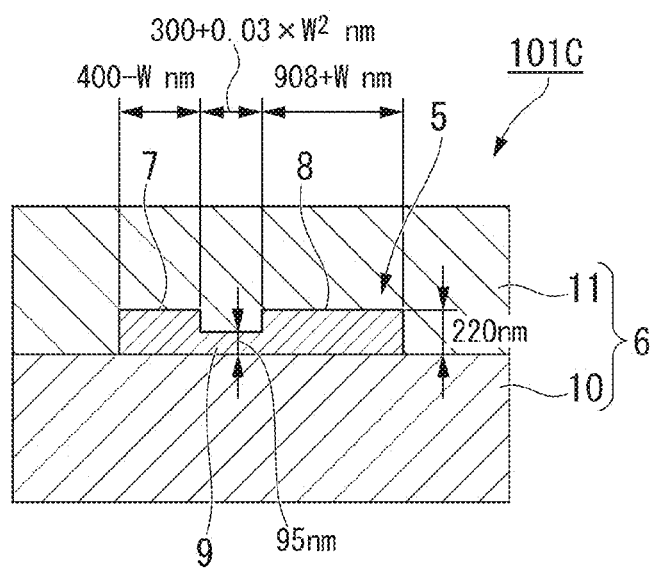
FIG. 34B is a sectional view of the planar optical waveguide device according to the third embodiment of the invention.

Next, a planar optical waveguide device 101C shown in FIGS. 34A and 34B will be described as a third embodiment. FIG. 34A is a plan view showing the planar optical waveguide device 101C, and FIG. 34B is a cross-sectional view of the planar optical waveguide device 101C based on line segment $Z_2$-$Z_2$ shown in FIG. 34A. Further, in the following description, a description of the same portions as in the planar optical waveguide device 1 will not be repeated, and are given the same reference numerals in the drawings.

The planar optical waveguide device 1 has a configuration in which the width of the slab portion 9 is uniform in the length direction of the first rib portion 7 and the second rib portion 8, but the planar optical waveguide device 101C shown in FIGS. 34A and 34B has a configuration in which the width of the slab portion 9 changes along the length direction of the first rib portion 7 and the second rib portion 8.

Specifically, the planar optical waveguide device 101C includes a mode converting section (mode conversion element) 12A in which a first bending waveguide 108 and a second bending waveguide 109 are coupled in different modes between an input side and an output side thereof.

The mode converting section 12A includes a narrow width portion 110, a width-decreasing portion 111, and a width-increasing portion 112. In the narrow width portion 110, the width of the slab portion 9 is smallest. In the width-decreasing portion 111, the width of the slab portion 9 continuously decreases toward the narrow width portion 110 from the input side. In the width-increasing portion 112, the width of the slab portion 9 continuously increases toward the output side from the narrow width portion 110.

The first rib portion 7 and the second rib portion 8 have a shape of being bent inward on both sides with the slab portion 9 being interposed therebetween. Further, in the mode converting section 12A, the width of the first rib portion 7 continuously decreases along a light waveguide length L, and the width of the second rib portion 8 continuously increases along the light waveguide length L.

In the planar optical waveguide device 101C of this embodiment, light that is guided in a $TE_0$ mode (indicated by an arrow $TE_0$ in FIG. 34A) is input to the first bending waveguide 108 and is mode-coupled by the mode converting section 12. Thus, the light is mode-converted into light that is guided in a $TE_1$ mode (indicated by an arrow $TE_1$ in FIG. 34A) and is output from the second bending waveguide 109.

The planar optical waveguide device 101C of this embodiment, the first bending waveguide 108 and the second bending waveguide 109 gradually become close to each other in the light waveguide length L, and then, gradually become distant from each other. Thus, similar to the planar optical waveguide device 1, the sizes of effective refractive indexes of two modes which are coupling targets are switched before and after a phase matching condition is satisfied.

Figure 35:
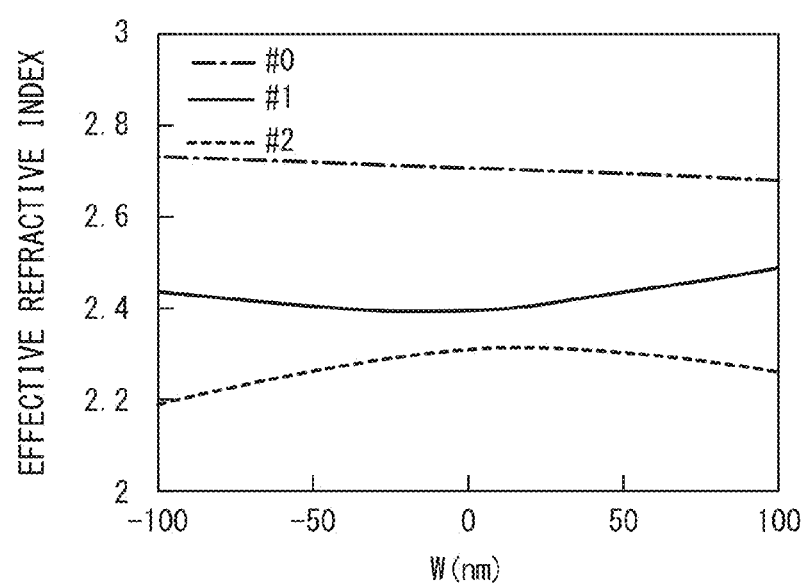
FIG. 35 is a graph of an effective refractive index corresponding to FIG. 4 with respect to the planar optical waveguide device shown in FIGS. 34A and 34B.

Here, graphs obtained by calculating changes of effective refractive indexes with respect to W when the first bending waveguide 108 and the second bending waveguide 109 are contiguous, with respect to the planar optical waveguide device 101C, are shown in FIG. 35. Conditions of this simulation are the same as in the case shown in FIG. 4.

It can be understood from the graph shown in FIG. 35 that light that is guided in the $TE_0$ mode is input to a starting edge (W=−100) of the first bending waveguide 108, is mode-coupled based on a super mode around a middle portion (W=0), is mode-converted into light that is guided in the $TE_1$ mode, and is output from an ending edge (W=+100) of the second bending waveguide 109.

Figure 36:
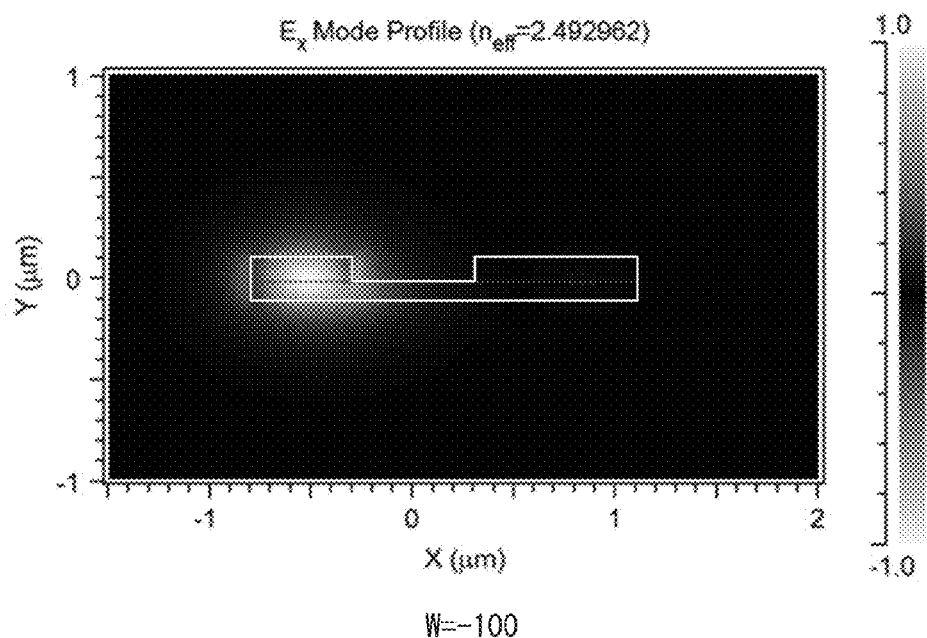
FIG. 36 is a graph obtained by calculating an $E_x$ component of an electric field distribution of #1 mode at a cross-sectional position of W=−100 through a simulation, with respect to the planar optical waveguide device shown in FIGS. 34A and 34B.
Figure 37:
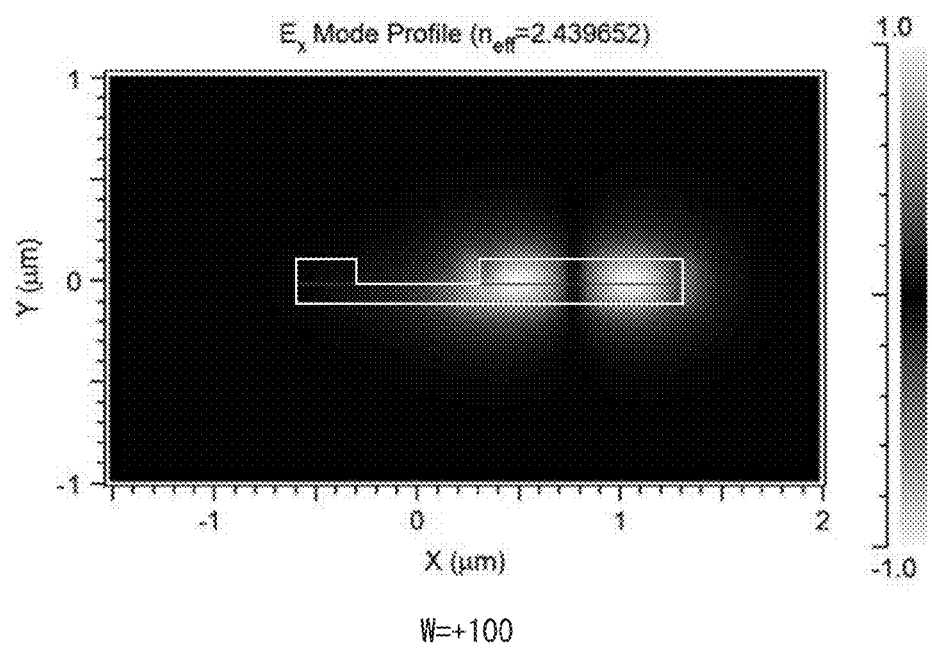
FIG. 37 is a graph obtained by calculating an $E_x$ component of an electric field distribution of #1 mode at a cross-sectional position of W=+100 through a simulation, with respect to the planar optical waveguide device shown in FIGS. 34A and 34B.

In order to confirm such a configuration, graphs obtained by calculating an $E_x$ component at a cross-sectional position of W=−100 of an electric field distribution and an $E_x$ component at a cross-sectional position of W=+100 of the electric field distribution are shown in FIGS. 36 and 37. In the graphs shown in FIGS. 36 and 37, the coordinates x and y represent a width direction and a height direction, respectively. Further, simulation conditions are the same as in the case shown in FIG. 35.

Figure 9:
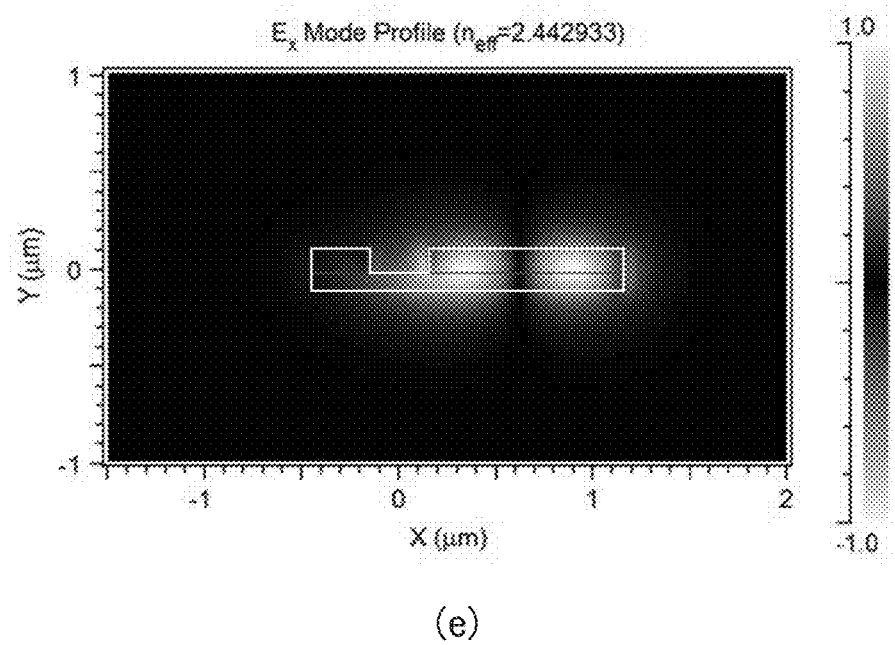
FIG. 9 is a graph obtained by calculating an $E_x$ component of an electric field distribution of #1 mode at a cross-sectional position (e) of W=+100 through a simulation.

On the other hand, when comparing the graphs shown in FIGS. 36 and 37 with the graphs shown in FIGS. 5 and 9, it can be understood that the planar optical waveguide device 101C shows strong confinement of light to one waveguide regardless of whether the widths of waveguides are the same and provides sufficiently weak coupling. This is because the planar optical waveguide device 101C achieves another effect that coupling to a contiguous waveguide becomes weak due to increase in the interval between the waveguides, in addition to the effect that the effective refractive indexes of the $TE_0$ mode and the $TE_1$ mode are shifted due to change in the widths of the waveguides so that phase matching is not performed.

According to the invention, it is necessary that coupling is sufficiently weak at a position distant from the vicinity of W=0 where phase coupling is performed. In a case where the coupling is not weakened, the input light of the $TE_0$ mode pumps another electric field to decrease conversion efficiency.

According to the invention, since a waveguide structure in which mode coupling is strengthened using a half-rib waveguide is used, it is possible to achieve another effect that coupling is weakened due to increase in the interval between the waveguides, in addition to the effect that coupling is weakened due to change in the widths of the waveguides. Accordingly, in the planar optical waveguide device 101C, it is possible to more efficiently perform mode conversion by increasing an interval between waveguides while changing the widths of the waveguides, and to shorten the device length. A method for increasing the interval between the waveguides is not particularly limited as long as the method can continuously increase the interval between the waveguides, without being limited to the above-described configuration of the planar optical waveguide device 101C.

Further, similar to the planar optical waveguide device 1, in the planar optical waveguide device 101C of this embodiment, light of the $TE_0$ mode different from the $TE_1$ mode generated by mode conversion from the first bending waveguide 108 to the second bending waveguide 109 is input to the second bending waveguide 109, and thus, it is possible to perform mode multiplexing in which the light of the $TE_1$ mode and the light of the $TE_0$ mode are simultaneously output from the second bending waveguide 109.

Fourth Embodiment

<Polarization Conversion Device>

Figure 38:
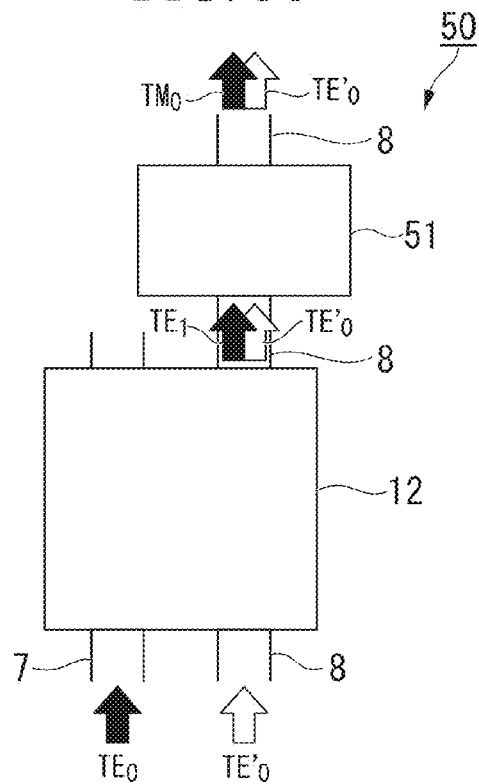
FIG. 38 is a schematic view showing an example of a polarization conversion device according to a fourth embodiment of the invention.

Next, a polarization conversion device 50 shown in FIG. 38 will be described as a fourth embodiment. FIG. 38 is a schematic view showing an example of the polarization conversion device (planar optical waveguide device) 50.

The polarization conversion device 50 shown in FIG. 38 includes a high-order polarization converting section (high-order polarization conversion device) 51 which is positioned on an output side of the mode converting section 12 of the planar optical waveguide device 1 and is connected to the second waveguide 4. As the high-order polarization converting section 51, for example, a high-order polarization conversion device disclosed in Non-Patent Literature 1 may be used. In this case, in order to use the polarization conversion device 51, it is necessary to change refractive indexes of the lower cladding 10 and the upper cladding 11.

In the polarization conversion device 50 of this embodiment, on the output side of the mode converting section 12 of the planar optical waveguide device 1, light (indicated by an arrow $TE_1$ in FIG. 38) that is guided in the $TE_1$ mode output from the second waveguide 4 is input to the high-order polarization converting section 51, is mode-converted into light (indicated by an arrow $TM_0$ in FIG. 38) that is guided in a $TM_0$ mode, and is output from the high-order polarization converting section 51.

Thus, in the polarization conversion device 50 of this embodiment, it is possible to convert the $TE_0$ mode into the $TM_0$ mode by combination of the mode converting section (mode conversion element) 12 that converts the $TE_0$ mode into the $TE_1$ mode and the high-order polarization converting section (high-order polarization conversion device) 51 that converts the $TE_1$ mode into the $TM_0$ mode.

Further, in the polarization conversion device 50 of this embodiment, since there is no influence on mode multiplexing in the mode converting section 12, it is also possible to perform polarization multiplexing of light of the $TE_0$ mode (indicated by an arrow $TE_0'$ in FIG. 38) and light of the $TM_0$ mode. In this case, the light of the $TE_0$ mode that is a multiplexing target may be input to the second waveguide 4 of the mode converting section 12.

Fifth Embodiment

<Polarization Conversion Device>

A polarization conversion device shown in FIG. 39 will be described as a fifth embodiment.

Figure 39:
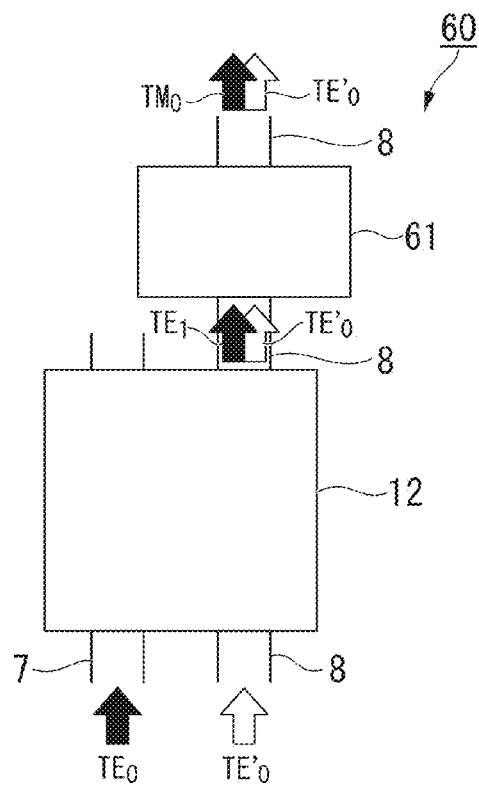
FIG. 39 is a schematic view showing an example of a polarization conversion device according to a fifth embodiment of the invention.

FIG. 39 is a schematic view showing an example of a polarization conversion device 60.

Figure 40:
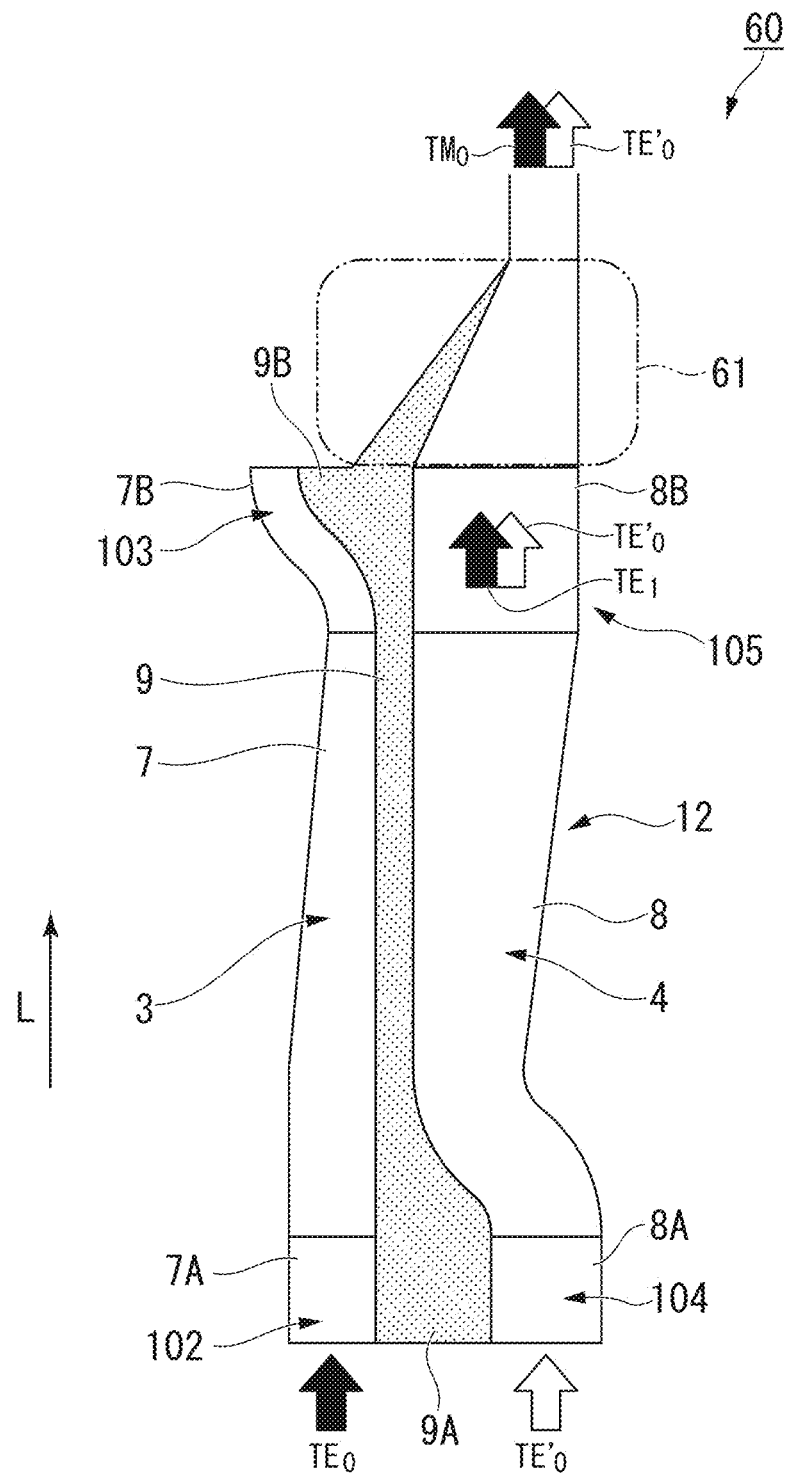
FIG. 40 is a plan view showing an example of the polarization conversion device shown in FIG. 39.

The polarization conversion device 60 shown in FIG. 39 includes a high-order polarization converting section (high-order polarization conversion device) 61 that is positioned on an output side of the mode converting section 12 of the planar optical waveguide device 1 and is connected to the second waveguide 4. As the high-order polarization converting section 61, for example, a high-order polarization conversion device as shown in FIG. 40 may be used. In FIG. 40, a description of the same portions as in the planar optical waveguide device 101, and the same reference numerals are given thereto.

Thus, in the polarization conversion device 60 of this embodiment, it is possible to convert the $TE_0$ mode into the $TM_0$ mode by combination of the mode converting section (mode conversion element) 12 that converts the $TE_0$ mode into the $TE_1$ mode and the high-order polarization converting section (high-order polarization conversion device) 61 that converts the $TE_1$ mode into the $TM_0$ mode.

Particularly, in this configuration, it is not necessary to change refractive indexes of the lower cladding 10 and the upper cladding 11 differently from a case where the polarization conversion device 51 is used. Further, since a refractive index cross section on the output side of the mode converting section 12 has a vertically asymmetric structure, as shown in FIG. 40, it is possible to continuously connect the high-order polarization conversion device 61 thereto.

Sixth Embodiment

<Dual Polarization-Quadrature Phase Shift Keying (DP-QPSK) Modulator>

Figure 41:
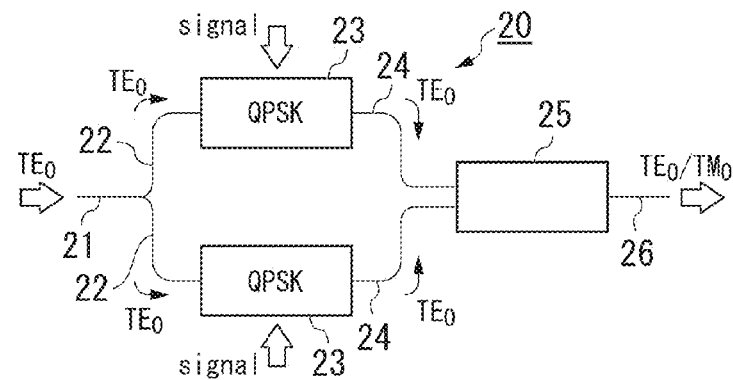
FIG. 41 is a schematic view showing an example of a DP-QPSK modulator according to a sixth embodiment of the invention.

Next, a DP-QPSK modulator 20 shown in FIG. 41 will be described as a sixth embodiment. FIG. 41 is a schematic view showing an example of the DP-QPSK modulator.

The planar optical waveguide device of the invention may be used, for example, for a DP-QPSK modulator disclosed in Reference Literature [1] (P. Dong, C. Xie, L. Chen, L. L. Buhl, and Y.-K. Chen, "112-Gb/s Monolithic PDM-QPSK Modulator in Silicon," in European Conference and Exhibition on Optical Communication (2012), Vol. 1, p. Th.3.B.1).

The DP-QPSK modulator 20 performs DP-QPSK modulation having a QPSK signal independent of both modes of $TE_0$ mode and a $TM_0$ mode using the fact that two modes of the $TE_0$ mode and the $TM_0$ mode can be present in a normal optical. Specifically, the DP-QPSK modulator 20 splits light input in the $TE_0$ mode from an input section 21 into two optical waveguides 22 and 22, and modulates the split lights into QPSK signals using QPSK modulators 23 and 23, respectively. Then, the DP-QPSK modulator 20 converts the $TE_0$ mode of one of optical waveguides 24 and 24 into the $TM_0$ mode by the polarization conversion device 25, combines the two modes on the same optical waveguide using a polarization beam combiner, and then, outputs signals independent of the $TE_0$ mode and the $TM_0$ mode to an output section 26.

Seventh Embodiment

<Coherent Receiver>

Next, a coherent receiver 30 shown in FIG. 42 will be described as a seventh embodiment.

Figure 42:
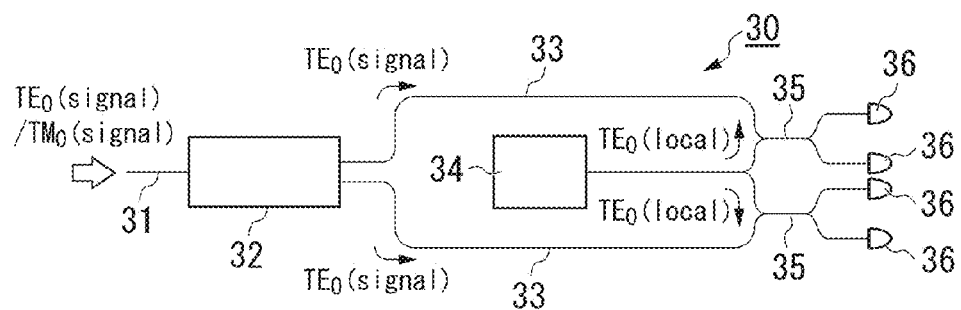
FIG. 42 is a schematic view showing an example of a coherent receiver according to a seventh embodiment of the invention.

FIG. 42 is a schematic view of an example of the coherent receiver 30.

A planar optical waveguide device of the invention may be used, for example, for a polarization diversity coherent receiver on an Si optical waveguide of a polarization multiplexing signal through which a $TE_0$ mode and a $TM_0$ mode are simultaneously transmitted, as disclosed in reference literature [2] (C. Doerr, et al., "Packaged Monolithic Silicon 112-Gb/s Coherent Receiver," IEEE Photonics Technology Letters, Vol. 23, p.p. 762, 2011).

The coherent receiver 30 connects an optical waveguide 31 of a polarization multiplexing signal through which a $TE_0$ mode and a $TM_0$ mode are simultaneously transmitted to a polarization conversion device 32 capable of simultaneously performing polarization conversion and polarization beam splitter, and splits the polarization multiplexing signal into a signal of the $TE_0$ mode for one of optical waveguides 33 and 33 and a signal of the $TE_0$ mode converted from the $TM_0$ for the other one of the optical waveguides 33 and 33. As a local light-emitting unit 34, a semiconductor laser light source which is generally used may be used, which uses only a single polarized wave, for example, an output of the $TE_0$ mode (local). In a case where such a light source is used, in the related art, it is necessary to perform polarization conversion of the local light-emitting unit.

However, in the coherent receiver 30, since any signal light after polarization separation becomes the $TE_0$ mode signal (signal), it is not necessary to perform polarization conversion of the local light-emitting unit. Signal light and light from the local light-emitting unit are output from a coupling section 36 through an optical multiplexing section 35.

In a case where an optical waveguide type structure is used in the polarization conversion device 32, light coupling with the outside of an element in the coupling section 36 may be performed using a coupler that does not have a polarization split function, such as a reverse taper type mode field converter to be coupled from a substrate side. The coupler may employ a reverse taper type structure disclosed in reference literature [3] (Qing Fang, et al., "Suspended optical fiber-to-waveguide mode size converter for Silicon photonics", OPTICS EXPRESS, Vol. 18, No. 8, 7763 (2010)), for example.

Eighth Embodiment

<Polarization Diversity>

Next, a polarization diversity shown in FIG. 43 will be described as an eighth embodiment.

Figure 43:
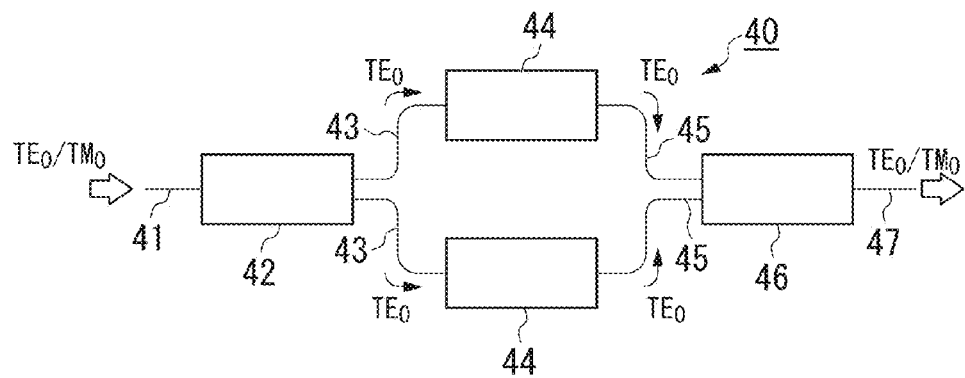
FIG. 43 is a schematic view showing an example of a polarization diversity system according to an eighth embodiment of the invention.

FIG. 43 is a schematic view of an example of a polarization diversity 40.

A planar optical waveguide device of the invention may be used for executing a polarization diversity method in a case where an element for assigning the same operation is to be used with respect to both modes in polarization multiplexing transmission in which a $TE_0$ mode and a $TM_0$ mode are simultaneously transmitted or in random transmission of one polarization, as disclosed in reference literature [4] (Hiroshi Fukuda, et al., "Silicon photonic circuit with polarization diversity," Optics Express, Vol. 16, No. 7, 2008), for example.

In the polarization diversity 40 shown in FIG. 43, an optical waveguide 41 of a polarization multiple signal through which a $TE_0$ mode and a $TM_0$ mode are simultaneously transmitted is connected to a polarization conversion device 42 capable of simultaneously performing polarization conversion and polarization beam splitter. Further, polarization multiple signal is split into a signal of the $TE_0$ mode for one of the optical guides 43 and 43 and a signal of the $TE_0$ mode converted from the $TM_0$ mode for the other one of the optical waveguides 43 and 43.

Signal lights of the $TE_0$ mode operated by elements 44 and 44 are combined by a polarization conversion device 46 from the optical waveguides 45 and 45, and are output to an optical waveguide 47 of a polarization multiple signal through which the TE₀ mode and the TM₀ mode are simultaneously transmitted.

Similar to the polarization diversity coherent receiver, the polarization conversion device of the invention capable of simultaneously performing polarization conversion and polarization beam splitter may be used as the polarization conversion device 42.

Further, similar to the DP-QPSK modulator, the polarization conversion device of the invention capable of simultaneously performing polarization conversion and polarization beam splitter may be used as the polarization conversion device 46.

Other Embodiments

The invention is not limited to the above-described embodiments, and various modifications may be made in a range without departing from the concept of the invention.

For example, in the tapered directional coupler, the interval between the rib portions 7 and 8 (the width of the slab portion 9) is uniform in the length direction, but the width may be changed on the way.

Further, in the tapered directional coupler, the width of the first rib portion 7 continuously decreases along the light waveguide direction, and the width of the second rib portion 8 continuously increases along the light waveguide direction. However, the rib portions may have arbitrary shapes in a range that satisfies the tapering condition. That is, it is sufficient if the sizes of effective refractive indexes of two coupling targets modes can be switched before and after a waveguide structure in which the phase matching condition is satisfied. In this case, instead of a waveguide structure in which both of two contiguous waveguides are tapered in a light waveguide direction, a waveguide structure in which only one waveguide is tapered may be used.

Further, in the tapering method, the width of the above-described rib portion may be changed in a curve shape, without limiting to a case where the widths of the rib portions are linearly changed. Further, the heights of the rib portions, the height of the slab portion, or the like, may be changed in the light waveguide direction so that effective refractive indexes may be adjusted.

Furthermore, in the tapered directional coupler, the input side and the output side of two contiguous waveguides are disposed to be perpendicular to the light waveguide direction, but may be disposed at an angle with respect to the light waveguide direction.

What is claimed is:

1. A planar optical waveguide device comprising:
a substrate;
a core that forms a first waveguide and a second waveguide that are arranged in parallel on the substrate; and
a cladding that covers the core and has a refractive index smaller than that of the core, wherein
the core comprises a first rib portion, a second rib portion, and a slab portion, the first rib portion forming the first waveguide, the second rib portion forming the second waveguide, and the slab portion being provided only on one side of the first rib portion and the second rib portion in a width direction to have a thickness smaller than the thicknesses of the first rib portion and the second rib portion, the slab portion being shared between the first rib portion and the second rib portion,
the first waveguide and the second waveguide form a mode converting section that is configured to convert a mode of light input to an input side thereof into a mode different from the former mode of the light between the input side and an output side thereof,
the mode converting section comprises a waveguide structure in which mode coupling is generated between the first waveguide and the second waveguide,
an effective refractive index of a first waveguide mode in the first waveguide and an effective refractive index of a second waveguide mode in the second waveguide match each other on at least a cross section perpendicular to a light transmission direction in the waveguide structure,
a magnitude relationship between the effective refractive index of the first waveguide mode and the effective refractive index of the second waveguide mode is switched between the input side and the output side with the one cross section being interposed therebetween, and
the mode converting section comprises a narrow width portion in which the width of the slab portion becomes smallest, a width-decreasing portion in which the width of the slab portion continuously decreases toward the narrow width portion from the input side, and a width-increasing portion in which the width of the slab portion continuously increases toward the output side from the narrow width portion.

2. The planar optical waveguide device according to claim 1, wherein
the first waveguide mode is a $TE_{(n-1)}$ mode having an n-th largest effective refractive index, and the second waveguide mode is a $TE_{(m-1)}$ mode having an m-th largest effective refractive index among TE modes in which an electric field is present in an in-plane direction of the substrate, and
the n and the m refer to natural numbers, in which m>n.

3. The planar optical waveguide device according to claim 1, wherein
the thicknesses of the slab portion, the first rib portion, and the second rib portion are uniform in a length direction.

4. The planar optical waveguide device according to claim 1, wherein
the thicknesses of the first rib portion and the second rib portion are the same.

5. The planar optical waveguide device according to claim 1, wherein
the core comprises a tapered waveguide on at least one of the input side and the output side of the mode converting section,
the tapered waveguide comprises a first slab portion that is continuously provided on a side surface of the first rib portion that faces the second rib portion, and a second slab portion that is continuously provided on a side surface of the second rib portion that faces the first rib portion, and
the first slab portion and the second slab portion are provided to be connected to the slab portion and to have a shape in which widths thereof continuously increase toward the slab portion.

6. The planar optical waveguide device according to claim 1, wherein
the core is formed of Si, and the cladding is formed of $SiO_2$.

7. The planar optical waveguide device according to claim 1, wherein the core is positioned on the output side of the mode converting section, and has a high-order polarization converting section connected to the second waveguide, and the high-order polarization converting section mode-converts light that is guided in a $TE_1$ mode having a second largest effective refractive index among TE modes, where an electric field is present in an in-plane direction of the substrate, output from the second waveguide into light that is guided in a $TM_0$ mode having the largest effective refractive index for output, among TM modes where a magnetic field is present in the in-plane direction of the substrate.

8. A DP-QPSK modulator that comprises the planar optical waveguide device according to claim 1.

9. A coherent receiver that comprises the planar optical waveguide device according to claim 1.

10. A polarization diversity that comprises the planar optical waveguide device according to of claim 1.

11. A planar optical waveguide device comprising:
a substrate;
a core that forms a first waveguide and a second waveguide that are arranged in parallel on the substrate; and
a cladding that covers the core and has a refractive index smaller than that of the core, wherein
the core comprises a first rib portion, a second rib portion, and a slab portion, the first rib portion forming the first waveguide, the second rib portion forming the second waveguide, and the slab portion being provided only on one side of the first rib portion and the second rib portion in a width direction to have a thickness smaller than the thicknesses of the first rib portion and the second rib portion, the slab portion being shared between the first rib portion and the second rib portion,
the first waveguide and the second waveguide form a mode converting section that is configured to convert a mode of light input to an input side thereof into a mode different from the former mode of the light between the input side and an output side thereof,
the mode converting section comprises a waveguide structure in which mode coupling is generated between the first waveguide and the second waveguide,
an effective refractive index of a first waveguide mode in the first waveguide and an effective refractive index of a second waveguide mode in the second waveguide match each other on at least a cross section perpendicular to a light transmission direction in the waveguide structure,
a magnitude relationship between the effective refractive index of the first waveguide mode and the effective refractive index of the second waveguide mode is switched between the input side and the output side with the one cross section being interposed therebetween, and
the core comprises a bending waveguide having a shape in which an interval between the first rib portion and the second rib portion continuously increases or decreases along a light waveguide direction due to bending at least one of the first rib portion and the second rib portion in a plane, in at least one of the input side and the output side of the mode converting section.

12. The planar optical waveguide device according to claim 11, wherein
the first waveguide mode is a $TE_{(n-1)}$ mode having an n-th largest effective refractive index, and the second waveguide mode is a $TE_{(m-1)}$ mode having an m-th largest effective refractive index among TE modes in which an electric field is present in an in-plane direction of the substrate, and
the n and the m refer to natural numbers, in which m>n.

13. The planar optical waveguide device according to claim 11, wherein
the thicknesses of the slab portion, the first rib portion, and the second rib portion are uniform in a length direction.

14. The planar optical waveguide device according to claim 11, wherein
the thicknesses of the first rib portion and the second rib portion are the same.

15. The planar optical waveguide device according to claim 11, wherein
the core comprises a tapered waveguide on at least one of the input side and the output side of the mode converting section,
the tapered waveguide comprises a first slab portion that is continuously provided on a side surface of the first rib portion that faces the second rib portion, and a second slab portion that is continuously provided on a side surface of the second rib portion that faces the first rib portion, and
the first slab portion and the second slab portion are provided to be connected to the slab portion and to have a shape in which widths thereof continuously increase toward the slab portion.

16. The planar optical waveguide device according to claim 11, wherein
the core is formed of Si, and the cladding is formed of $SiO_2$.

17. The planar optical waveguide device according to claim 11, wherein
the core is positioned on the output side of the mode converting section, and has a high-order polarization converting section connected to the second waveguide, and
the high-order polarization converting section mode-converts light that is guided in a $TE_1$ mode having a second largest effective refractive index among TE modes, where an electric field is present in an in-plane direction of the substrate, output from the second waveguide into light that is guided in a $TM_0$ mode having the largest effective refractive index for output, among TM modes where a magnetic field is present in the in-plane direction of the substrate.

18. A DP-QPSK modulator that comprises the planar optical waveguide device according to claim 11.

19. A coherent receiver that comprises the planar optical waveguide device according to claim 11.

20. A polarization diversity that comprises the planar optical waveguide device according to of claim 11.

* * * * *